United States Patent
Jinno et al.

(10) Patent No.: US 9,752,289 B2
(45) Date of Patent: Sep. 5, 2017

(54) ROAD SURFACE CONDITION DETERMINING METHOD, ROAD SURFACE CONDITION OUTPUTTING METHOD, ROAD SURFACE CONDITION DETERMINING DEVICE AND ROAD SURFACE CONDITION OUTPUT EQUIPMENT

(71) Applicant: KOMATSU LTD., Minato-ku (JP)

(72) Inventors: Tomoko Jinno, Hitachinaka (JP); Ryota Ono, Kawasaki (JP); Yasuko Yamamoto, Hitachinaka (JP)

(73) Assignee: Komatsu Ltd., Minato-ku, Tokyo (JP)

( * ) Notice: Subject to any disclaimer, the term of this patent is extended or adjusted under 35 U.S.C. 154(b) by 122 days.

(21) Appl. No.: 14/423,943

(22) PCT Filed: Mar. 19, 2014

(86) PCT No.: PCT/JP2014/057589
§ 371 (c)(1),
(2) Date: Feb. 25, 2015

(87) PCT Pub. No.: WO2015/140966
PCT Pub. Date: Sep. 24, 2015

(65) Prior Publication Data
US 2016/0258118 A1    Sep. 8, 2016

(51) Int. Cl.
*G01C 21/00* (2006.01)
*E01C 23/01* (2006.01)
(Continued)

(52) U.S. Cl.
CPC ............. *E01C 23/01* (2013.01); *B60W 40/06* (2013.01); *G01C 7/04* (2013.01); *G01C 21/26* (2013.01); *B60W 2510/22* (2013.01)

(58) Field of Classification Search
CPC ...... B60C 19/00; B60C 23/00; B60G 2206/99
(Continued)

(56) References Cited

U.S. PATENT DOCUMENTS 4,674,767 A *  6/1987 Kuroki ............... B60G 17/0165
                                                    267/64.16
4,770,438 A     9/1988 Sugasawa et al.
(Continued)

FOREIGN PATENT DOCUMENTS

CA     2863786 A1    8/2013
JP     S62-029409 A  2/1987
(Continued)

OTHER PUBLICATIONS

Office Action dated Oct. 15, 2015 for corresponding Australian Patent Application No. 2014311182, 5 pages.
(Continued)

*Primary Examiner* — Gertrude Arthur Jeanglaude
(74) *Attorney, Agent, or Firm* — Fish & Richardson P.C.

(57) ABSTRACT

A road surface condition determining method according to the invention includes: detecting a suspension pressure of a dump truck during a travel of the dump truck; calculating a maximum amplitude and a frequency of a detection value of the suspension pressure in a predetermined period of time; and determining a road surface condition based on the maximum amplitude and the frequency.

14 Claims, 19 Drawing Sheets

(51) Int. Cl.
*B60W 40/06* (2012.01)
*G01C 21/26* (2006.01)
*G01C 7/04* (2006.01)

(58) Field of Classification Search
USPC ............. 701/70, 71, 80, 91, 461; 303/160
See application file for complete search history.

(56) References Cited

U.S. PATENT DOCUMENTS

| | | | |
|---|---|---|---|
| 5,384,706 A | | 1/1995 | Uchiyama et al. |
| 5,444,621 A | * | 8/1995 | Matsunaga ........ B60G 17/0165 280/5.518 |
| 5,736,939 A | | 4/1998 | Corcoran |
| 6,184,784 B1 | | 2/2001 | Shibuya |
| 8,095,306 B2 | | 1/2012 | Villalobos et al. |
| 2004/0094912 A1 | | 5/2004 | Niwa et al. |
| 2004/0122580 A1 | | 6/2004 | Sorrells |
| 2005/0178628 A1 | | 8/2005 | Uchino et al. |
| 2008/0082347 A1 | | 4/2008 | Villalobos et al. |
| 2010/0204887 A1 | | 8/2010 | Ichinose et al. |
| 2011/0173039 A1 | | 7/2011 | Villalobos et al. |
| 2013/0116972 A1 | | 5/2013 | Hanatsuka et al. |
| 2014/0350879 A1 | | 11/2014 | Takiguchi et al. |
| 2015/0032373 A1 | | 1/2015 | Ikari |

FOREIGN PATENT DOCUMENTS

| | | |
|---|---|---|
| JP | H02-138809 A | 5/1990 |
| JP | H04-201613 A | 7/1992 |
| JP | H08-025935 A | 1/1996 |
| JP | 2001101565 A | 4/2001 |
| JP | 2004161018 A | 6/2004 |
| JP | 2005-255152 A | 9/2005 |
| JP | 2010187480 A | 8/2010 |
| JP | 2013169956 A | 9/2013 |
| WO | WO 2013/099984 | 7/2013 |
| WO | WO 2013/122065 | 8/2013 |

OTHER PUBLICATIONS

Pete Holman, Caterpillar Haul Road Design and Management, retrieved Jan. 20, 2014 from URL:http://www.directminingservices.com/wp-content/uploads/2010/06/CAT-Haul-Road-Design.pdf, 2006.
International Search Report from corresponding International Application No. PCT/JP2014/057589, dated Jun. 10, 2014, 3 pages.
Office Action dated May 4, 2016 for corresponding Canadian Patent Application No. 2892987, 7 pages.
International Preliminary Report on Patentability from corresponding International Application No. PCT/JP2014/057589, dated Sep. 20, 2016, 5 pages.

* cited by examiner

FIG. 3

```
CONDITION ACQUIRING UNIT —32
  ENGINE SPEED SENSOR —25 — TM →
  TRANSMISSION SPEED
  SUSPENSION PRESSURE SENSOR —26
    RIGHT-FRONT WHEEL DETECTION VALUE — FR →
    LEFT-FRONT WHEEL DETECTION VALUE — FL →
    RIGHT-REAR WHEEL DETECTION VALUE — RR →
    LEFT-REAR WHEEL DETECTION VALUE — RL →
    LOAD AMOUNT — PLM →
  INCLINATION SENSOR —36 — I (INCLINATION ANGLE) →
  RUDDER ANGLE SENSOR —37 — Ang (RUDDER ANGLE) →
```

- GPS ANTENNA —29A
- POSITION INFORMATION DETECTOR —29 — POSITION INFORMATION —291
- ROAD SURFACE CONDITION DETERMINING DEVICE —30
  - ARITHMETIC UNIT —301
  - ROAD SURFACE CONDITION DETERMINING UNIT —302
- IN-VEHICLE WIRELESS COMMUNICATION DEVICE —27
- WIRELESS COMMUNICATION ANTENNA —27A

IN-VEHICLE MEMORY —31
| Field | Symbol |
|---|---|
| SPEED | v |
| LOAD AMOUNT | PLM |
| SUDDEN BRAKING RECORD | 311 |
| PITCH FREQUENCY | PPHz |
| MAXIMUM PITCH AMPLITUDE | PP |
| TWIST FREQUENCY | PTHz |
| MAXIMUM TWIST AMPLITUDE | PT |
| ROLL FREQUENCY | PRHz |
| MAXIMUM ROLL AMPLITUDE | PR |
| ROAD SURFACE CONDITION DETERMINATION VALUE | 312 |
| POSITION INFORMATION | 291 |
| RIGHT-FRONT WHEEL REFERENCE PRESSURE | P0fr |
| LEFT-FRONT WHEEL REFERENCE PRESSURE | P0fl |
| RIGHT-REAR WHEEL REFERENCE PRESSURE | P0rr |
| LEFT-REAR WHEEL REFERENCE PRESSURE | P0rl |

—20

ROAD SURFACE CONDITION DETERMINING METHOD, ROAD SURFACE CONDITION OUTPUTTING METHOD, ROAD SURFACE CONDITION DETERMINING DEVICE AND ROAD SURFACE CONDITION OUTPUT EQUIPMENT

CROSS-REFERENCE TO RELATED APPLICATIONS

This application claims priority to International Application No. PCT/JP2014/057589 filed on Mar. 19, 2014, the contents of which application are incorporated herein by reference.

TECHNICAL FIELD

The present invention relates to a road surface condition determining method, a road surface condition outputting method, a road surface condition determining device and road surface condition output equipment.

BACKGROUND ART

In construction sites and mining sites, routes on which haulage vehicles such as dump trucks often travel are unpaved, so that the road surface of such routes are getting rough as a result of frequent travel of the haulage vehicles.

Accordingly, a maintenance system for road maintenance in mines is known (for instance, Patent Literature 1).

Further, in order to perform maintenance of such mine roads, a method in which the suspension pressure of a traveling haulage vehicle is measured to determine the roughness of the road surface is also suggested (see, for instance, Non-Patent Literature 1).

CITATION LIST

Patent Literature(s)

Patent Literature 1: U.S. Pat. No. 8,095,306

Non-Patent Literature(s)

Non-Patent Literature 1: Pete Holman. (2006). *Caterpillar Haul Road Design and Management*. Retrieved Jan. 20, 2014, from URL:http://www.directminingservices.com/wp-content/uploads/2010/06/CAT-Haul-Road-Design.pdf

SUMMARY OF THE INVENTION

Problem(S) to be Solved by the Invention

A typical determining method using the suspension pressure of a haulage vehicle is, however, poor in accuracy in determining a road surface condition, so that a serviceperson needs to inspect an actual road surface by himself and take a picture of it to determine the road surface condition. Therefore, determination of a road surface condition is troublesome and time-consuming An object of the invention is to provide a road surface condition determining method, a road surface condition outputting method, a road surface condition determining device and road surface condition output equipment, which are capable of prompt and highly accurate determination of a road surface condition.

Means for Solving the Problem(s)

According to a first aspect of the invention, a road surface condition determining method includes: detecting a suspension pressure of a haulage vehicle during a travel of the haulage vehicle; calculating a maximum amplitude and a frequency of a detection value of the suspension pressure in a predetermined period of time; and determining a road surface condition based on the maximum amplitude and the frequency.

In the above aspect, the suspension pressure varies in response to an impact due to unevenness of the road surface. Specifically, when the unevenness is reduced by leveling the road surface, a variation in the suspension pressure becomes small, whereas when the unevenness is large, a variation in the suspension pressure becomes large.

Accordingly, it can be easily determined whether the road surface is a good road, at least the road surface of which is leveled, or a poor road having a road surface with large unevenness by detecting the maximum amplitude of the suspension pressure in the predetermined period of time.

Further, since the road surface condition is determined based on the maximum amplitude in combination with the frequency, even a road surface condition unlikely to be determined only based on the maximum amplitude can be determined based on the frequency (i.e., a pattern of the unevenness). Therefore, in the above aspect of the invention where the road surface condition is determined based on two parameters including the maximum amplitude and the frequency of the detection value of the suspension pressure in the predetermined period of time, the road surface condition can be promptly and accurately determined without the need for a serviceperson to inspect the road surface.

In the above aspect it is preferable that the detection value of the suspension pressure be detected to determine the road surface condition when a load amount of a load substance on the haulage vehicle corresponds to an empty state or a loaded state of the haulage vehicle.

In the empty state, the amount of the load substance on the haulage vehicle is approximately in a range from 0 to 10% of a rated load amount (i.e., the amount of the load substance on the haulage vehicle is almost zero). In the loaded state, the amount of the load substance on the haulage vehicle is approximately in a range from 90 to 110% of the rated load amount (i.e., the amount of the load substance on the haulage vehicle is substantially equal to the rated load amount).

The maximum amplitude and the frequency of the detection value of the suspension pressure in the predetermined period of time vary depending on the load amount as well as the unevenness of the road surface. Accordingly, in determining the road surface condition based on the maximum amplitude, criteria have to be set for each load amount.

Further, when any load substance is loaded on a haulage vehicle used in a mine or the like, the haulage vehicle is supposed to travel in the loaded state in order to improve operation efficiency. Specifically, the haulage vehicle usually travels in the empty state from a dump site for dumping the load substance to a loading site for loading the load substance and in the loaded state from the loading site to the dump site.

Accordingly, as long as the road surface condition is determined when the haulage vehicle is in the empty state or in the loaded state, the road surface condition can be determined practically without any problem irrespective of a reduction in the number of the criteria.

In the above aspect, it is preferable that the road surface condition determining method further include correcting the detection value of the suspension pressure with at least one of a rudder angle of the haulage vehicle, a measurement value of an inclination sensor, and a vehicle speed measurement value to obtain a correction value of the suspension pressure, in which the road surface condition is determined based on a maximum amplitude and a frequency of the correction value in the predetermined period of time.

The detection value of the suspension pressure may be corrected based on the rudder angle of the haulage vehicle, thereby obtaining a correction value corrected for an influence of a displacement of the on-vehicle load in a right-and-left direction due to the turning of the haulage vehicle. Additionally, the detection value may be corrected with the measurement value of the inclination sensor, thereby calculating a correction value corrected for an influence of a displacement of the on-vehicle load due to an inclination of the road surface. Further, the detection value may be corrected with the vehicle speed measurement value, thereby calculating a correction value corrected for an influence of a displacement of the on-vehicle load in a front-and-rear direction due to a change in the vehicle speed resulting from sudden deceleration or acceleration. A variation in the detection value depending on the road surface condition can thus be accurately detected to improve the accuracy of determination of the road surface condition. It should be noted that the vehicle speed measurement value may be obtained by detecting the speed of a transmission output shaft or by detecting a wheel speed.

In the above aspect, it is preferable that the road surface condition determining method further include obtaining a detection value of a load shift in a pitch direction based on the suspension pressure, in which the road surface condition is determined based on a maximum amplitude and a frequency of the detection value of the load shift in the predetermined period of time.

The load shift in the haulage vehicle includes pitch, roll and twist. Among the above, pitch is a suitable factor for detecting a variation in the suspension pressure of the traveling haulage vehicle due to the unevenness of the road surface. Accordingly, when the detection value is obtained in terms of pitch, the accuracy of determination of the road surface condition can be improved as compared with the case where the detection value is obtained in terms of roll or twist.

In the above aspect, it is preferable that the road surface condition determining method further include: detecting position information of the haulage vehicle during the travel of the haulage vehicle; and associating a determination result of the road surface condition with the position information.

When the position information of the traveling haulage vehicle is detected and associated with the determination result of the road surface condition, the road surface condition of each spot in the travel route can be easily recognized. This results in facilitating road surface maintenance such as road leveling.

According to a second aspect of the invention, a method for outputting the road surface condition determined by the road surface condition determining method preferably includes outputting map data showing the determination result of the road surface condition, the map data being prepared based on the position information and the determination result of the road surface condition associated with each other.

When the position information of the haulage vehicle is detected and associated with the determination result of the road surface condition, map data showing the determination result of the road surface condition can be automatically produced and outputted. The map data may be printed out and presented to a manager of the mine or the haulage vehicle, thereby easily informing the manager of a spot requiring road surface maintenance to promptly perform road surface maintenance.

According to a third aspect of the invention, a method for outputting the road surface condition determined by the road surface condition determining method, the haulage vehicle traveling a same route in a plurality of cycles, the method for outputting the road surface condition preferably includes: acquiring the determination result of the road surface condition per each of the plurality of cycles as a cycle data set; and outputting the cycle data set of each of the plurality of cycles in a form of distribution data.

The plurality of cycle data sets are thus outputted in the form of distribution data, thereby easily finding a change in a poor-road percentage in the route and thus easily determining a timing for road surface maintenance.

According to a fourth aspect of the invention, a road surface condition determining device includes: a pressure detector configured to detect a suspension pressure of a haulage vehicle during a travel of the haulage vehicle; an arithmetic unit configured to calculate a maximum amplitude and a frequency of a detection value of the suspension pressure in a predetermined period of time; and a road surface condition determining unit configured to determine a road surface condition based on the maximum amplitude and the frequency.

In the above aspect, it is preferable that the road surface condition determining device further include: a position information detector configured to detect position information of the haulage vehicle during the travel of the haulage vehicle; and a first memory configured to store the position information and the determination result of the road surface condition in association with each other.

The road surface condition determining device can thus provide effects identical to those of the road surface condition determining method.

According to a fifth aspect of the invention, output equipment for outputting the road surface condition determined by the road surface condition determining device includes: a data loader configured to acquire and store the position information and the determination result of the road surface condition associated with each other in a second memory; and an output unit configured to output map data showing the determination result of the road surface condition, the map data being prepared based on the position information and the determination result of the road surface condition stored in the second memory.

Further, in the above aspect, the output equipment for outputting the road surface condition determined by the road surface condition determining device, the haulage vehicle traveling a same route in a plurality of cycles, the output equipment preferably includes: a data loader configured to acquire the determination result of the road surface condition per each of the plurality of cycles as a cycle data set and store the cycle data set in a second memory; and an output unit configured to output the cycle data set of each of the plurality of cycles stored in the second memory in a form of distribution data.

The road surface condition output equipment can thus provide effects identical to those of the road surface condition outputting method.

BRIEF DESCRIPTION OF DRAWING(S)

FIG. 3 is a functional block diagram showing the arrangement of the dump truck.

DESCRIPTION OF EMBODIMENT(S)

Exemplary embodiment(s) of the invention will be described below with reference to the attached drawings.

Figure 1:
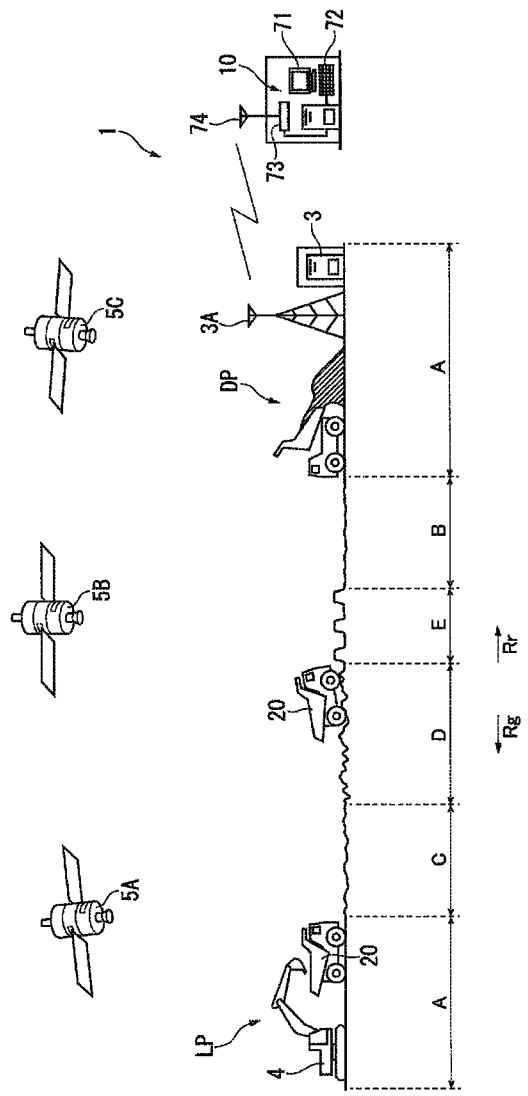
FIG. 1 shows a management system for a haulage vehicle according to an exemplary embodiment of the invention.

FIG. 1 shows a management system 1 for a haulage vehicle according to an exemplary embodiment of the invention. The management system 1, which is configured to manage a dump truck 20 (a haulage vehicle) used in a mine or the like, includes: a wireless communication equipment 3 that collects operation information of the dump truck 20 through wireless communication in the mine; and road surface condition output equipment 10 capable of communicating with the wireless communication equipment 3.

Examples of a substance (a load substance) to be carried by the dump truck 20 include crushed stone, soil, sand, rock and coal, but may include any other substance.

The dump truck 20 travels between a site (hereinafter, referred to as a dump site) DP for dumping a load substance and a site (hereinafter, referred to as a loading site) LP for loading a substance with a loader 4. In the exemplary embodiment, the dump truck 20 without any load substance (in an empty state) travels from the dump site DP to the loading site LP so that the dump truck 20 is loaded with a load substance at the loading site LP, and then the dump truck 20 with the load substance (in a loaded state) travels to the dump site DP to dump the load substance there.

Accordingly, a route R for the dump truck 20 is determined, the route R including an outgoing route Rg for the dump truck 20 to travel from the dump site DP to the loading site LP and a return route Rr for the dump truck 20 to travel from the loading site LP to the dump site DP. It should be noted that the outgoing route Rg and the return route Rr may be the same or different as long as the outgoing route Rg and the return route Rr define the same route R.

The route R includes the dump site DP and the loading site LP, which are defined as the start and end of the route R, respectively. The dump truck 20 travels the same route R back and forth.

Schematic Arrangement of Management System for Haulage Vehicle

The management system 1 for the dump truck 20 (the haulage vehicle) includes the road surface condition output equipment 10 that collects and outputs information of a determination result of a road surface condition determined on the side of the dump truck 20. The road surface condition output equipment 10, for instance, outputs the determination result of the road surface condition of the route R, for instance, in the form of map data showing the determination result superimposed on a map of the route R and/or in the form of a report chronologically listing the determination result per traveling the route R back and forth along with the number of times of traveling. The outputted map data and/or the report is presented to a manager in charge of managing the route R so that he or she can understand the road condition of the route R to efficiently maintain the road surface. As a result, the dump truck 20 is less likely to travel a rough road surface, so that the damage of the dump truck 20 can be reduced and the malfunction of the dump truck 20 can be suppressed, which result in saving maintenance costs. Further, a maintained road surface results in reducing the travel time of the dump truck 20, and thus in improving a load-transport efficiency and in saving fuel costs.

In the mine, the wireless communication equipment 3 that wirelessly communicates with the dump truck 20 is provided. The wireless communication equipment 3 includes an antenna 3A and communicates with the dump truck 20 through a wireless LAN (Local Area Network) or the like. An area where the wireless communication equipment 3 can communicate with the dump truck 20 via the antenna 3A usually fails to cover the entire route R. Therefore, a communication process between the dump truck 20 and wireless communication equipment 3 is performed only when the dump truck 20 is in the communication-available area where the wireless communication equipment 3 can communicate with the dump truck 20. For instance, the communication process may be performed with the dump truck 20 when the dump truck 20 is being refueled at a gas station built in the communication-available area.

The wireless communication equipment 3 outputs data received from the dump truck 20 to the road surface condition output equipment 10. It should be noted that the road surface condition output equipment 10 may be located in a management office in the mine, somewhere in the country having the mine, or in a foreign country.

Specifically, when the road surface condition output equipment 10 is located in the management office in the mine, the wireless communication equipment 3 and the road surface condition output equipment 10 may be connected through a network cable. When the road surface condition output equipment 10 is located somewhere in the country (e.g., a company in charge of managing the mine or the dump truck 20) or in a management office in a foreign country, the wireless communication equipment 3 and the road surface condition output equipment 10 may be connected through a mobile phone network or a satellite network so that the wireless communication equipment 3 and the road surface condition output equipment 10 can communicate with each other.

Dump Truck

Figure 2:
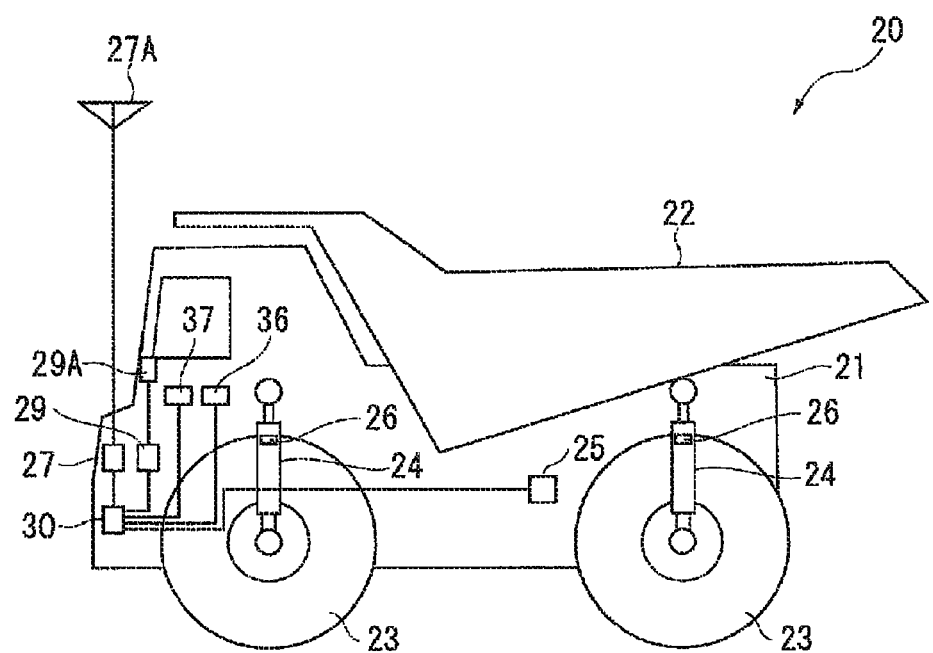
FIG. 2 shows an arrangement of a dump truck as the haulage vehicle.

FIG. 2 shows an arrangement of the dump truck. The dump truck 20 travels with a load substance and dumps the load substance at a desired site. The dump truck 20 includes a vehicle body 21, a vessel 22, wheels 23, a suspension cylinder 24, a rotation sensor 25, a suspension pressure sensor (a pressure sensor) 26, an in-vehicle wireless communication device 27 connected to a wireless communication antenna 27A, a position information detector 29 (a GPS receiver in the exemplary embodiment) connected to a GPS antenna 29A, a road surface condition determining device 30, an inclination sensor 36, and a rudder angle sensor 37. It should be noted that the dump truck 20 is also provided with a variety of mechanisms and functions of a typical haulage vehicle in addition to the above elements. In the exemplary embodiment, the invention is applied to a rigid-frame dump truck (i.e., the dump truck 20) steered with front wheels (i.e., the wheels 23), but the invention is also applicable to an articulated dump truck including a vehicle body divided into front part and rear part articulated with flexibility.

The dump truck 20 is mechanically driven by transmitting an output from an internal combustion engine such as a diesel engine through a transmission to the wheels 23, but may be driven in a different manner. For instance, the dump truck 20 may be electrically driven by driving a motor with an electric power to drive the wheels 23, the electric power being generated by a generator driven by an inner combustion engine such as a diesel engine.

The vessel 22 functions as a truck box and disposed on an upside of the vehicle body 21. In the vessel 22, substances such as quarried crushed stone, rock, soil and coal are loaded with the loader 4 such as a hydraulic excavator. The wheels 23, each of which includes a tire and a wheel body, are attached to the vehicle body 21 and driven with a power transmitted from the vehicle body 21 as described above. The suspension cylinder 24 is disposed between each of the wheels 23 and the vehicle body 21. A load corresponding to the weights of the vehicle body 21, the vessel 22 and the load substance loaded in the vessel 22 acts on each of the wheels 23 via the suspension cylinder 24.

The rotation sensor 25 detects a speed TM of a transmission output shaft or a speed TM of the wheels 23. The road surface condition determining device 30 calculates a vehicle speed and an acceleration of the dump truck 20 from the speed TM.

The suspension cylinder 24, in which a hydraulic fluid is sealed, extends and contracts in response to the weight of the load substance. It should be noted that the suspension pressure sensor (also referred to as pressure sensor, if needed) 26 detects a load on the suspension cylinder 24. The suspension cylinder 24 includes suspension cylinders 24 for right and left front wheels and right and left rear wheels of the dump truck 20 and, correspondingly, the suspension pressure sensor 26 (a pressure detector) includes suspension pressure sensors 26 provided to these suspension cylinders 24. The suspension pressure sensor 26 for a right-front wheel detects a detection value FR, the suspension pressure sensor 26 for a left-front wheel detects a detection value FL, the suspension pressure sensor 26 for a right-rear wheel detects a detection value RR, and the suspension pressure sensor 26 for a left-rear wheel detects a detection value RL.

Further, the pressure of the hydraulic fluid in each of the suspension pressure sensors 26 is detected to measure the weight of the load substance (load amount). It should be noted that the load amount is outputted in the form of a percentage (%) to a rated load amount.

The GPS antenna 29A receives an electric wave outputted from a plurality of GPS satellites 5A, 5B, 5C of a GPS (Global Positioning System) (see FIG. 1). The GPS antenna 29A outputs the received electric wave to the position information detector 29. The position information detector 29 converts the electric wave received by the GPS antenna 29A into an electric signal to calculate position information 291 of the position information detector 29 (i.e., the dump truck 20) (position measurement). In other words, the position information detector 29 serves as a position information detector of the invention, and the position information 291 includes the latitude, longitude and altitude of the dump truck 20.

The in-vehicle wireless communication device 27 wirelessly communicates with the wireless communication equipment 3 through the wireless communication antenna 27A and the antenna 3A as shown in FIG. 1. The in-vehicle wireless communication device 27 is connected to the road surface condition determining device 30. With this arrangement, the road surface condition determining device 30 sends and receives various information through the wireless communication antenna 27A.

The inclination sensor 36 is attached to the vehicle body of the dump truck 20 to detect an inclination of the vehicle body. The inclination sensor 36 detects a front-and-rear inclination of the dump truck 20 (pitch) and an widthwise inclination of the dump truck 20 (roll).

The rudder angle sensor 37 includes, for instance, a potentiometer that detects a rotation angle of a steering link for steering the right and left front wheels (steerable wheels).

Road Surface Condition Determining Device and Peripherals Thereof

FIG. 3 is a functional block diagram showing the road surface condition determining device 30 and peripherals thereof. The dump truck 20 is connected to the road surface condition determining device 30, an in-vehicle memory 31, the in-vehicle wireless communication device 27 and the position information detector 29. Further, the road surface condition determining device 30 is connected to a condition acquiring unit 32.

The road surface condition determining device 30, which is, for instance, a computer (a vehicle controller) including a combination of a CPU (Central Processing Unit) and a memory, includes an arithmetic unit 301 and a road surface condition determining unit 302. The arithmetic unit 301 and the road surface condition determining unit 302 perform a determining process for a road surface condition. Specifically, the arithmetic unit 301 calculates a maximum amplitude and a frequency of a detection value of the suspension pressure in a predetermined period of time, and the road surface condition determining unit 302 determines the road surface condition based on the maximum amplitude and the frequency. Specific operation of each of the arithmetic unit 301 and the road surface condition determining unit 302 will be described later.

The condition acquiring unit 32 is a device for acquiring various information about the operation state of the dump truck 20 to determine the road surface condition. The condition acquiring unit 32 includes the rotation sensor 25, the suspension pressure sensors 26, the inclination sensor 36, the rudder angle sensor 37 and the like. The road surface condition determining device 30 acquires various information about the operation state of the dump truck 20 from the condition acquiring unit 32 and determines the road surface condition based on the acquired information.

Information Acquired from Rotation Sensor

The road surface condition determining device 30 acquires the speed TM of the transmission output shaft or the speed TM of the wheels 23 from the rotation sensor 25.

Information Acquired from Suspension Pressure Sensor

The road surface condition determining device 30 acquires a pressure applied to the hydraulic fluid in each of the suspension cylinders 24 detected by each of the pressure sensors 26 provided to each of the wheels 23 of the dump truck 20 (e.g., four pressure sensors 26 in the case of four wheels 23) to acquire information indicating the right-front wheel detection value FR, the left-front wheel detection value FL, the right-rear wheel detection value RR and the left-rear wheel detection value RL.

Further, the four detection values FR, FL, RR, RL are summed to obtain the weight of the load substance (a load amount PLM). In the exemplary embodiment, the load amount PLM is outputted in the form of a percentage (%) to the rated load amount.

The pressure applied to the hydraulic fluid in each of the suspension cylinders 24 detected by each of the pressure sensors 26 indicates whether the vessel 22 of the dump truck 20 is loaded with a load substance (i.e., the loaded state) or the load substance is dumped from the vessel 22 (i.e., the empty state).

Information Acquired from Inclination Sensor

The inclination sensor 36 detects an inclination angle of the vehicle body to discriminate between an inclination due to a road surface inclination (slope) and an inclination due to an impact caused by the unevenness of the road surface. Specifically, the inclination sensor 36 mainly acquires a front-and-rear inclination angle I (a pitch angle) of the vehicle body.

Information Acquired from Rudder Angle Sensor

The rudder angle sensor 37 detects a rudder angle Ang when an operator of the dump truck 20 moves a steering.

In-Vehicle Memory

The in-vehicle memory 31 includes, for instance, one of a RAM (Random Access Memory), a ROM (Read Only Memory), a flash memory and a hard disc drive or a combination thereof The in-vehicle memory 31 stores, for instance, a computer program in with a command for the road surface condition determining device 30 to perform a road surface condition determining process, and various setting values for the operation of the management system 1.

The road surface condition determining device 30: reads the computer program; acquires operation information from the condition acquiring unit at a predetermined timing; processes the operation information with the arithmetic unit 301 and the road surface condition determining unit 302; and stores data obtained by processing the operation information in the in-vehicle memory 31. Specifically, the road surface condition determining device 30 stores the operation information obtained during the back and forth travel of the dump truck 20 along the outgoing route Rg from the dump site DP (the start of the route) to the loading site LP and along the return route Rr from the loading site LP to the dump site DP (the end of the route) as a cycle data set.

The in-vehicle memory 31 stores a speed (vehicle speed) v, the load amount PLM, a sudden braking record 311, a pitch frequency PPHz, a maximum pitch amplitude PP, a twist frequency PTHz, a maximum twist amplitude PT, a roll frequency PRHz, a maximum roll amplitude PR and a road surface condition determination value 312, every second as described later.

In the in-vehicle memory 31, correction reference values including a right-front wheel reference pressure P0fr, a left-front wheel reference pressure P0fl, a right-rear wheel reference pressure P0rr and a left-rear wheel reference pressure P0rl are also stored.

Further, the position information 291 detected by the position information detector 29 is also stored in association with the road surface condition determination value.

The above operation information stored in the in-vehicle memory 31 is merely an example and any other information may also be stored.

Upon reception of a command signal for sending the operation information from the road surface condition output equipment 10 of the management system 1 or the wireless communication equipment 3, the road surface condition determining device 30 sends the operation information stored in the in-vehicle memory 31 to the wireless communication equipment 3 through the in-vehicle wireless communication device 27. The wireless communication equipment 3 sends the received operation information to the road surface condition output equipment 10.

Road Surface Condition Output Equipment

Figure 4:
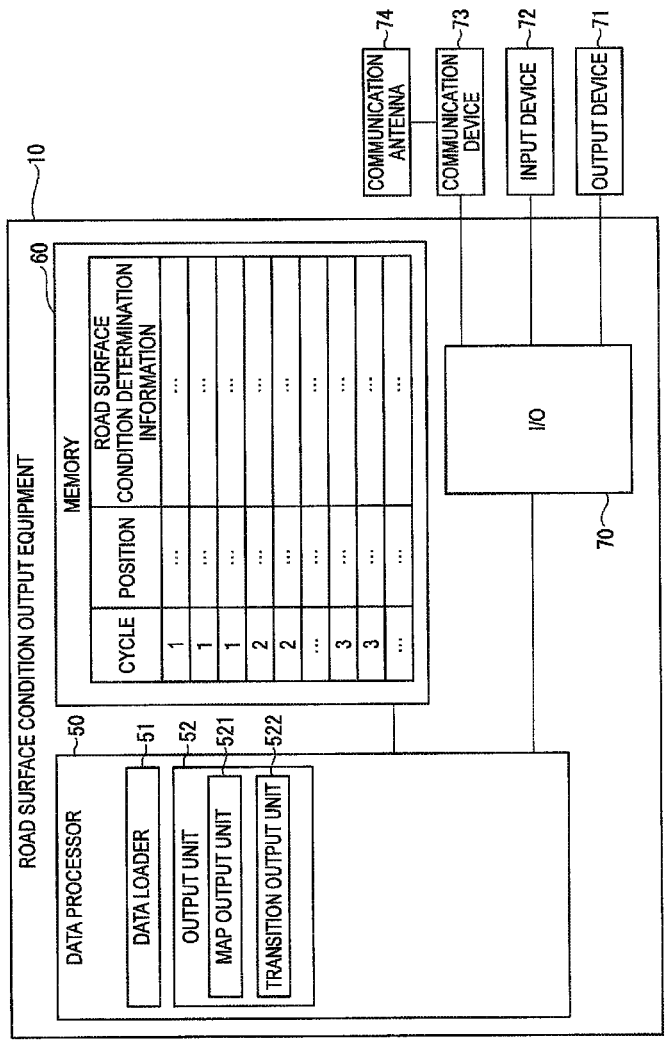
FIG. 4 is a functional block diagram showing an arrangement of road surface condition output equipment.

FIG. 4 is a functional block diagram of the road surface condition output equipment 10. The road surface condition output equipment 10, which may be a server located in, for instance, a company in charge of managing the operation of the dump truck 20, includes a data processor 50, a memory 60 and an I/O unit (I/O) 70. The I/O unit 70 is an interface for the input/output of information between the data processor 50 and an external device. The I/O unit 70 is connected to an output device 71 (e.g., a display and a printer), an input device 72 (e.g., a keyboard and a mouse) and a communication device 73. The communication device 73 is connected to a communication antenna 74. The road surface condition output equipment 10 thus communicates with the wireless communication equipment 3 through the communication device 73.

The data processor 50 includes a CPU (Central Processing Unit). The memory 60 includes a RAM (Random Access Memory), a ROM (Read Only Memory), a flash memory, a hard disc drive or the like.

Data Processor

The data processor 50 includes a data loader 51 and an output unit 52.

Data Loader

The data loader 51 loads the operation information (the various information stored in the in-vehicle memory 31) as the cycle data set per traveling the route R in the memory 60, the operation information being sent from the dump truck 20 and received by the communication device 73 through the wireless communication equipment 3.

Specifically, the data loader 51 loads the following information along with cycle information in the memory 60: the speed (vehicle speed) v, the load amount PLM, the sudden braking record 311, the pitch frequency PPHz, the maximum pitch amplitude PP, the twist frequency PTHz, the maximum twist amplitude PT, the roll frequency PRHz, the maximum roll amplitude PR, the road surface condition determination value 312 (the determination result of the road surface condition), and the position information 291, which are stored in the in-vehicle memory 31 of the dump truck 20 every one second.

When the dump truck 20 travels back and forth two or more times, data sets of two or more cycles are stored in the memory 60. When a plurality of dump trucks 20 each travels the route R back and forth two or more times, two or more cycle data sets of each of the dump trucks 20 may be stored.

However, as long as information of one of the plurality of dump trucks 20 is sufficient for determining the road surface condition of the route R, it is not necessary to obtain information of the plurality of dump trucks 20.

It should be noted that a cycle data set(s) in a predetermined period of time is stored in the memory 60. For instance, when a cycle data set(s) obtained in one week is stored, analysis is performed on the obtained cycle data set(s).

Output Unit

The output unit 52 includes a map output unit 521 and a transition output unit 522.

The map output unit 521 outputs map data to the output device 71, the map data being prepared based on the road surface condition determination value 312 stored in the memory 60 and the position information 291 associated with the road surface condition determination value 312 and showing the road surface condition determination value superimposed on a map.

The transition output unit 522 outputs to the output device 71 distribution data showing the road surface condition determination values 312 of two or more cycles stored in the memory 60.

It should be noted that the map output unit 521 and the transition output unit 522 of the output unit 52 may output the data to a printer, display or the like as the output device 71 or, alternatively, to a predetermined management device or the like.

Road Surface Condition Determining Process

Next, a road surface condition determining process performed by the road surface condition determining device 30 will be described with reference to a flow chart of FIG. 5.

It should be noted that installation of the road surface condition determining device 30 in the dump truck 20 requires initialization of the inclination sensor 36 and the rudder angle sensor 37. Specifically, the dump truck 20 is moved to a flat road to set a reference point (zero point) of each of the inclination sensor 36 and the rudder angle sensor 37.

Figure 5:
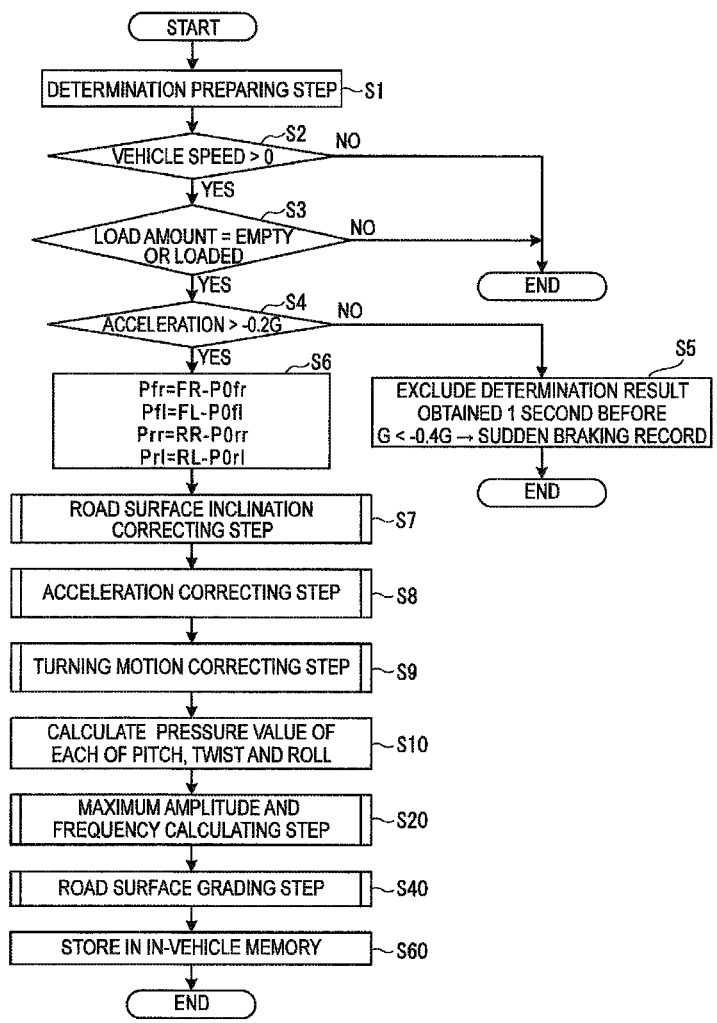
FIG. 5 is a flow chart showing a process according to a road surface condition determining method.
Figure 6:
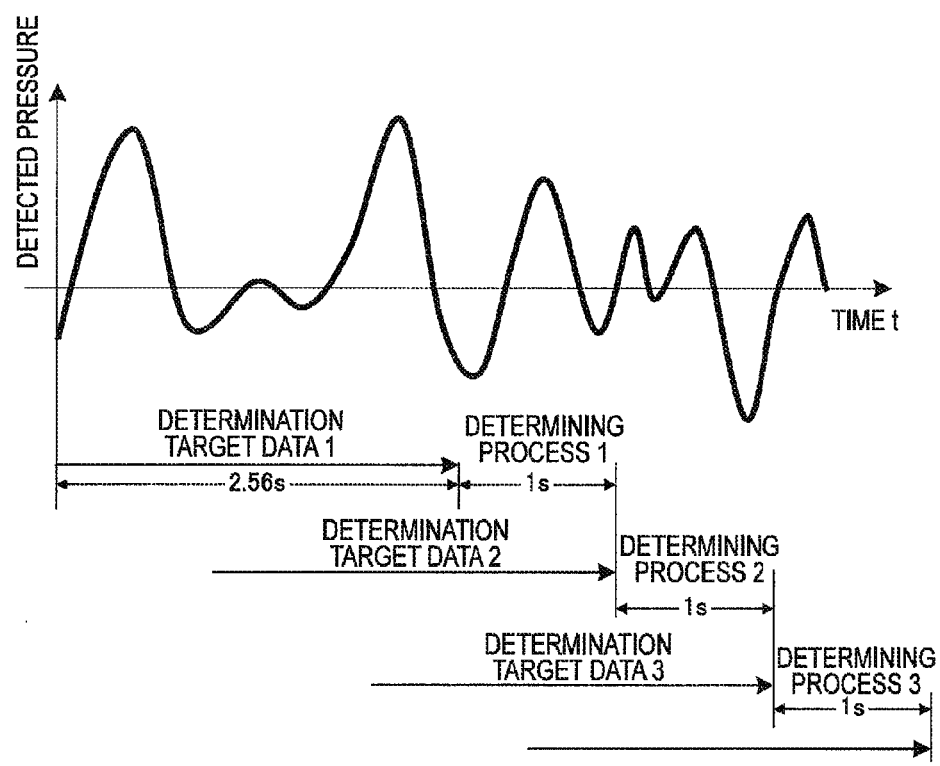
FIG. 6 is a graph showing a range of determination target data.

The road surface condition determining process shown in FIG. 5 is performed, for instance, every second as shown in FIG. 6. Calculations in each determining process are performed on data acquired in the last 2.56 seconds. Specifically, as shown in FIG. 6, the determining process is performed based on determination target data 1 acquired in the last 2.56 seconds during a period of a determining process 1 and is performed based on determination target data 2 during a period of a determining process 2.

It should be noted that in the exemplary embodiment, a calculation target data range is determined based on a minimum period of time (i.e., 2.56 seconds) required for determining the amplitude of a suspension pressure vibration, but, alternatively may be determined depending on, for instance, the resolution of the suspension pressure sensors 26.

At the start of the road surface condition determining process shown in FIG. 5, the road surface condition determining device 30 performs a determination preparing step (step S1). In the determination preparing step S1, a vehicle speed v, an acceleration Gx, the inclination angle I, the rudder angle Ang and the load amount PLM are calculated or read. The reference values P0fr, P0fl, P0rr, P0rl of suspension pressure detected by the suspension pressure sensors 26 are acquired.

The vehicle speed v (m/s) is calculated by, for instance, a transmission speed TM×0.0236/3.6. In other words, the speed TM is multiplied by a predetermined coefficient appropriate for, for instance, the diameter of the wheels 23, and divided by a constant of 3.6 to convert a distance per hour into a distance per second. The acceleration Gx (G) is calculated by, for instance, dividing a speed variation in one second by a gravity g. The load amount is acquired in the form of a percentage (%) to the rated load amount from the pressure sensors 26.

Each of the reference values P0fr, P0fl P0rr, P0rl is an average of detection values detected by each of the suspension pressure sensors 26 in one second while the dump truck 1 is parked on a flat road. Specifically, the road surface condition determining device 30: detects each of the detection values FR, FL, RR, RL every 0.01 seconds with the suspension sensors 26, while the inclination angle I detected by the inclination sensor 36 falls within a range from −3 degrees to +3 degrees and a speed shift lever is in a neutral position; calculates an average of 100 data values (one second) of each of the detection values FR, FL, RR, RL to obtain each of the reference values P0fr, P0fl, P0rr, P0rl; and stores these reference values in the in-vehicle memory 31 in advance.

Next, the road surface condition determining device 30 determines whether or not the vehicle speed v exceeds zero m/s (i.e., whether or not the dump truck 20 is parked) (step S2).

When the result is Yes in step S2, the road surface condition determining device 30 determines whether the load amount PLM corresponds to the empty state or the loaded state (step S3).

In the empty state, the vessel 22 is almost emptied. Specifically, the load amount is equal to or lower than a first preset value. In the exemplary embodiment where the load amount is represented by a percentage (%) to the rated load amount, the road surface condition determining device 30 sets the first preset value at 10% and determines that the dump truck 20 is in the empty state when the load amount falls within a range from 0% to 10%. It should be noted that in the case of outputting the load amount as a specific weight, the first preset value may also be represented by weight. For instance, when the dump truck 20 has a rated load amount of 90 tons, the first preset value may be set at, for instance, nine tons.

In the loaded state, the load amount is substantially the same as the rated load amount. Specifically, the load amount is not less than a second preset value but not more than a third present value. In the exemplary embodiment, the second present value is set at 90% and the third preset value is set at 110%, so that the road surface condition determining device 30 determines that the dump truck 20 is in the loaded state when the load amount falls within a range from 90% to 110%.

When the result is Yes in step S3, the road surface condition determining device 30 determines whether or not the acceleration Gx exceeds −0.2 G (step S4). In other words, it is determined whether or not a sudden braking operation has been done. When the result is No in step S4, it is determined that the sudden braking operation has not been done.

When the result is No in any of step S2, S3 or S4, the road surface condition determining device 30 terminates the road surface condition determining process. For instance, when the dump truck 20 is parked (No in step S2), the road surface condition determining device 30 terminates the determining process. This is because when the dump truck 20 does not travel, the road surface condition cannot be determined based on a variation detected by the suspension pressure sensors 26.

Similarly, when the load amount corresponds to neither the empty state nor the loaded state (e.g., the load amount is more than 10% but less than 90%) (No in step S3), the process is terminated without determining the road surface condition. This is because in the exemplary embodiment, criteria for determining a road surface condition are set based on the detection values of the suspension pressure sensors 26 only when the dump truck 20 is in the empty state or in the loaded state. If the criteria for determining a road surface condition were set for each load amount, the road surface condition could be determined even when the dump truck 20 is in neither the empty state nor the loaded state. However, in the exemplary embodiment, the criteria are not determined for each load amount, so that the determining process is terminated.

When the acceleration Gx is equal to or less than −0.2 G (No in step S4), a sudden braking operation is supposed to be done and thus a determination result obtained one second before is likely to have an influence of the sudden brake. Therefore, the road surface condition determining device 30 excludes (deletes) the determination result obtained one second before and stored in the in-vehicle memory 31 (step S5). When the acceleration Gx is less than −0.4 G, it can be reliably determined that the sudden braking operation has been done, so that a flag indicating that a sudden braking operation has been done is added to the sudden braking record 311 in the in-vehicle memory 31 (step S5).

In the case of an acceleration of −0.2 G or less, a sudden braking operation is highly likely to have been done. In this case, the detection values of the suspension pressure sensors 26 may be influenced and thus the road surface condition may be erroneously determined based on these detection values. Similarly, the determination result obtained one second before may also have an error because the sudden brake possibly started to be applied one second before. Accordingly, when the result is No in step S4, the determination result obtained one second before is excluded as well as the current determination result.

When the result is Yes in step S4 (i.e., Yes in each of steps S2 to S4), the arithmetic unit 301 of the road surface condition determining device 30 subtracts the reference values P0fr, P0fl, P0rr, P0rl stored in the in-vehicle memory 31 from the detection values FR, FL, RR, RL detected by the suspension pressure sensors 26 to calculate offset suspension pressure values (hereinafter, simply referred to as pressure values) Pfr, Pfl, Prr, Prl, respectively (step S6).

In other words, Pfr=FR−P0fr, Pfl=FL−P0fl, Prr=RR−P0rr, and Prl=RL−P0rl. The respective centers of variations in the pressure values Pfr, Pfl, Prr, Prl can thus be set at zero point (0 Mpa) by subtracting the reference values from the detection values.

Next, the arithmetic unit 301 of the road surface condition determining device 30 corrects the pressure values Pfr, Pfl, Prr, Prl. In the exemplary embodiment, correction is performed in terms of three factors such as road surface inclination, sudden brake and turning-motion operation, which have an influence on the suspension pressures.

First, the road surface condition determining device 30 performs a correcting step for eliminating the influence of the road surface inclination (step S7).

Secondly, the road surface condition determining device 30 performs a correcting step for eliminating the influence of an acceleration resulting from braking or the like (step S8).

Finally, the road surface condition determining device 30 performs a correcting step for eliminating the influence of the turning-motion operation (step S9).

The above correcting steps will be described below in detail.

Road Surface Inclination Correcting Step

Figure 7:
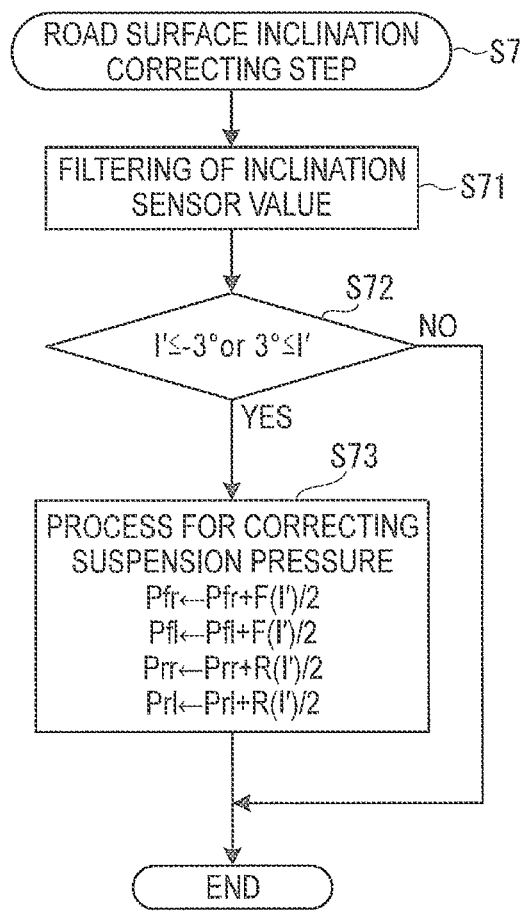
FIG. 7 is a flow chart showing a road surface inclination correcting step.

In the road surface inclination correcting step S7, a process shown in FIG. 7 is performed, beginning with filtering of the detection value (inclination angle I) from the inclination sensor 36 to discriminate between an inclination due to a road surface inclination (slope) and an inclination due to an impact caused by the unevenness of the road surface (step S71).

In the filtering step S71, when the detection value of the inclination sensor 36 is denoted by I, a value I' as filtered is calculated by a formula of $I'(t+1)=I(t+1) \times (1-a) + I'(t) \times a$. In the formula, $a=e^{-2} \times Pi \times f \times T$. Pi is a ratio of the circumference of a circle to its diameter. T is a sampling time (e.g., 0.01 seconds). f is a filter frequency (e.g., 0.08 Hz). (t+1) and (t) are signs for the current value and the last value, respectively.

The filtering step eliminates the inclination value due to the impact caused by the unevenness of the road surface to obtain an inclination correction value I' representing the inclination angle of the road surface inclination (slope).

Subsequently, the road surface condition determining device 30 determines whether or not the inclination correction value I' obtained in the filtering step S71 is −3 degrees or less or +3 degrees or more (step S72).

When the result is No in step S72, the dump truck 20 is supposed to travel a substantially flat road and an error in the detection value from the inclination sensor 36 is within an allowable range, so that the road surface condition determining device 30 determines that the correcting step in terms of road surface inclination is not required and terminates the road surface inclination correcting step S7.

In contrast, when the result is Yes in step S72, the road surface condition determining device 30 corrects the suspension pressures in consideration of a load shift due to the road surface inclination (step S73).

Figure 8:
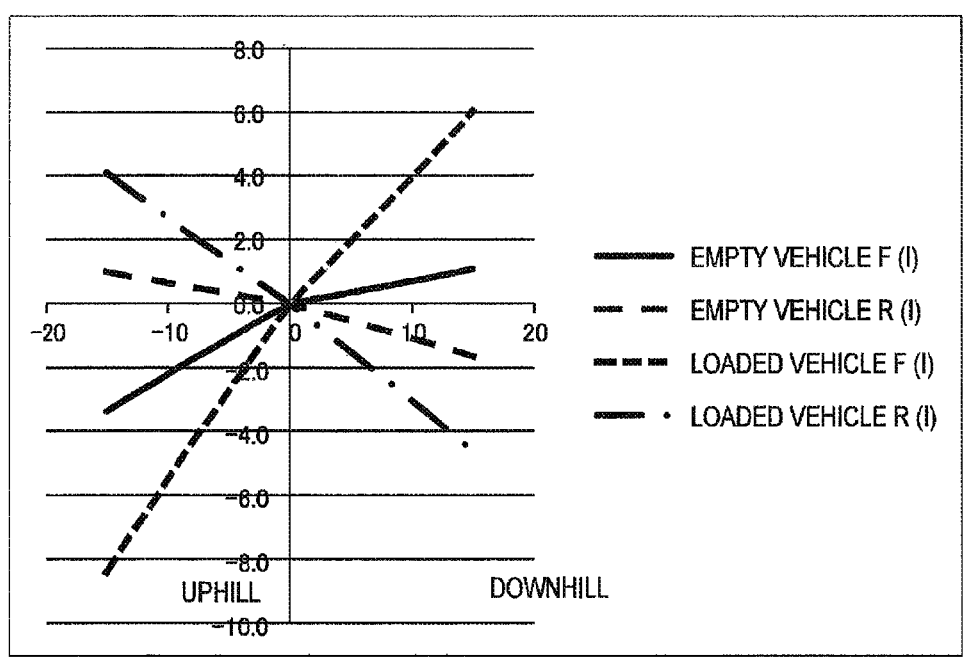
FIG. 8 is a graph showing correction amounts in accordance with road surface inclination angles.

In the road surface inclination pressure correcting step S73, a front-wheel pressure correction value F(I') and a rear-wheel pressure correction value R(I') are calculated from the inclination correction value I' calculated in the step S71 and the load amount with reference to a graph of FIG. 8. The inclination correction value I' is negative when the dump truck 20 runs up a slope and is positive when the dump truck 20 runs down a slope. The dump truck 20 can be determined to be in the empty state or in the loaded state from the load amount. Accordingly, the road surface condition determining device 30 calculates the pressure correction values F(I'), R(I') with reference to the graph of FIG. 8. The pressure values Pfr, Pfl, Prr, Prl are updated as new pressure values Pfr, Pfl, Prr, Prl by correcting each of them with the pressure correction value F(I') or the pressure correction value R(I').

Specifically, the pressure values Pfr, Pfl, Prr, Prl are respectively updated as follows: Pfr←Pfr+F(I')/2, Pfl←Pfl+F(I')/2, Prr←Prr+R(I')/2 and Prl←Prl+R(I')/2. In the above formulae, the pressure values Pfr, Pfl, Prr, Prl are each added with the half of the pressure correction value F(I') or the pressure correction value R(I') so that the pressure correction value F(I') or the pressure correction value R(I') is evenly applied to the right and left wheels 23. Incidentally, in FIG. 8, a horizontal axis represents an inclination and a vertical axis represents a correction factor.

Acceleration Correcting Step

Figure 9:
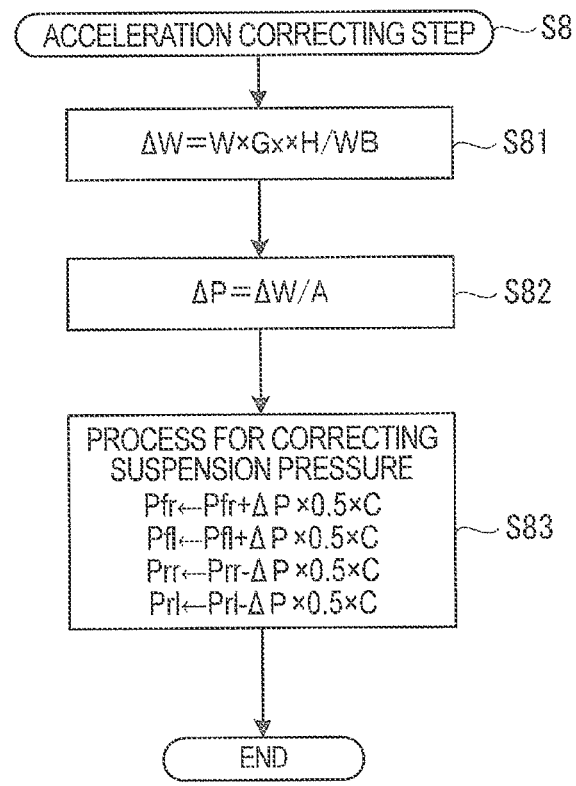
FIG. 9 is a flow chart showing an acceleration correcting step.

When a speed change is caused by, for instance, applying a brake or operating an accelerator or the like for acceleration, the arithmetic unit 301 of the road surface condition determining device 30 performs an acceleration correcting step S8, in which a process shown in FIG. 9 is performed to compensate an influence of a load shift in a front-and-rear direction of the vehicle body due to the speed change on the detection values of the suspension pressure sensors 26.

First, the road surface condition determining device 30 calculates a load shift $\Delta W$ from the acceleration Gx (G), a vehicle weight W (kg), a centroid height H (m), the area A (cm²) of each of the suspension cylinders 24 and a front-and-rear wheelbase distance WBx (m) (step S81). Specifically, $\Delta W = W \times Gx \times H/WB$.

It should be noted that the acceleration Gx is an acceleration in the front-and-rear direction of the vehicle body and is represented as a speed change per second. Specifically, $Gx=\{v(1000\ s)-v(1\ s)\}/9.8$. In the formula, v(1000 s) is an average speed per 1000 seconds. v(1 s) is a speed per second. The acceleration is thus obtained by subtracting the speed per second from the average speed per 1000 seconds and dividing the obtained value by gravity. Therefore, in the case of deceleration due to sudden brake or the like, the acceleration Gx is less than zero (a negative value), whereas in the case of acceleration due to the operation of the accelerator, the acceleration Gx is zero or more (a positive value).

In the above formula, the vehicle weight W is an emptied-vehicle weight+the load amount. In the empty state, the vehicle weight W is equal to the emptied-vehicle weight, whereas in the loaded state, the vehicle weight W is equal to a loaded-vehicle weight. For instance, when the emptied-vehicle weight is 72300 kg and the rated load amount is 91000 kg, the vehicle weight W in the empty state is 72300 kg, whereas the vehicle weight in the loaded state is 163300 kg (72300 kg+91000 kg).

Similarly, the centroid height H also varies depending on the presence or absence of the load substance and thus varies depending on whether the dump truck 20 is in the empty state or in the loaded state. For instance, the centroid height H in the empty state is 1.924 m, whereas the centroid height H in the loaded state is 3.064 m.

Therefore, the load shift $\Delta W$ is different depending on whether the dump truck 20 is in the empty state or in the loaded state.

Next, a suspension pressure variation $\Delta P$ (Mpa) due to the load shift is calculated by $\Delta P = \Delta W/A$ (step S82). Specifically, $\Delta P$ is obtained by dividing a force applied to each of the suspension cylinders 24 at the load shift $\Delta W$ by the pressure-receiving area A (e.g., 346.4 cm²). Similarly, in the case of deceleration, $\Delta P$ is negative because $\Delta W$ is negative, whereas in the case of acceleration, $\Delta P$ is positive because $\Delta W$ is positive.

Next, the pressure values Pfr, Pfl, Prr, Prl are updated as new pressure values Pfr, Pfl, Prr, Prl by correcting them with the pressure variation $\Delta P$ due to the load shift (step S83).

Specifically, the pressure values Pfr, Pfl, Prr, Prl are respectively updated as follows: Pfr←Pfr+$\Delta P$×0.5×C, Pfl←Pfl+$\Delta P$×0.5×C, Prr←Prr–$\Delta P$×0.5×C, and Prl←Prl–$\Delta P$×0.5×C. In the above formulae, $\Delta P$ is multiplied by 0.5 so that $\Delta P$ is evenly applied to the right and left wheels 23.

Further, $\Delta P$ is multiplied by a factor C to adjust a calculation value to a measurement value, the factor C being based on measurement data obtained by experiment. The factor coefficient C is, for instance, 0.3.

When a sudden brake is applied, the vehicle body undergoes a forward load shift and thus the suspension pressure for each of the front wheels is increased, so that the detection values detected by the suspension pressure sensors 26 are also increased by an influence of the load shift. In this case, $\Delta P$ is negative, so that the pressure values Pfr, Pfl for the front wheels are each corrected by subtracting a pressure corresponding to the load shift therefrom in the acceleration correcting step S8. In contrast, the pressure values Prr, Prl for the rear wheels are each corrected by adding the pressure corresponding to the load shift thereto.

Turning Motion Correcting Step

Figure 10:
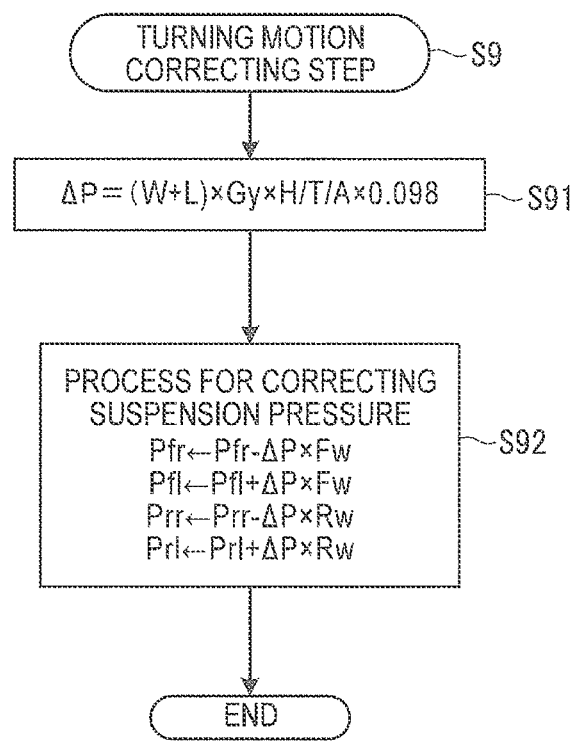
FIG. 10 is a flow chart showing a turning motion correcting step.

In a turning motion correcting step S9, a process shown in FIG. 10 is performed to correct the detection values of the suspension pressure sensors 26 for an influence of a load shift in a right-and-left direction of the vehicle body due to a centrifugal force applied when the dump truck 20 is turned by a steering operation.

First, the road surface condition determining device 30 calculates a suspension pressure variation $\Delta P$ (Mpa) due to a right-and-left load shift from: the rudder angle Ang (°), the area A (cm²) of each of the suspension cylinders 24, a right-and-left wheelbase distance WBy (m), a minimum turning radius Rmin (m), a right-and-left distance between the front tires T (m), the vehicle weight W (kg), the centroid height H (m), a front-wheel load ratio Fw (%), a rear-wheel load ratio Rw (%), the vehicle speed v (m/s), a turning radius R (m) and a lateral acceleration at turning Gy (G) (step S91).

Specifically, the vehicle speed $v=TM \times 0.0236/3.6$, the turning radius $R=WBy/\sin(Ang \times PI/180)$, and the lateral acceleration at turning $Gy=v \times v/R/9.8$.

Further, $\Delta P=(W+L) \times Gy \times H \times T/A \times 0.098$.

It should be noted that specific examples of the above variables are as follows: WBy=4.95 m, Rmin=10.1 m, and T=4.325 m. Fw may be set at 47% when the vehicle is emptied and 31.5% when the vehicle is loaded, whereas Rw may be set at 53% when the vehicle is emptied and 68.5% when the vehicle is loaded. The examples of the other variables are already described and thus the explanation thereof is omitted here.

Next, the pressure values Pfr, Pfl, Prr, Prl are updated as new pressure values Pfr, Pfl, Prr, Prl by correcting them with the pressure variation $\Delta P$ due to the right-and-left load shift (step S92).

Specifically, the pressure values Pfr, Pfl, Prr, Prl are respectively updated as follows: Pfr←Pfr–$\Delta P$×Fw, Pfl←Pfl+$\Delta P$×Fw, Prr←Prr–$\Delta P$×Rw, and Prl←Prl+$\Delta P$×Rw.

In the above formulae, the correction value is added to correct each of the left wheels 23 and is subtracted to correct each of the right wheels 23 because whether the rudder angle Ang is positive or negative is determined depending on whether the dump truck 20 is turned right or left.

Calculation of Pitch, Twist and Roll Pressure Values

After the correcting steps S7, S8, S9, the road surface condition determining device 30 calculates pressure values PP, PT, PR of pitch, twist (rack) and roll (bias) from the corrected pressure values Pfr, Pfl, Prr, Prl as shown in FIG. 5 (step S10). It should be noted that since the pressure value of the pitch is suitable for determining the road surface condition, so that only the pitch pressure may be calculated.

In the step S10, the arithmetic unit 301 calculates as follows: pitch pressure=Pfl+Pfr−Prl−Prr, twist pressure=Pfl−Pfr−Prl+Prr, and roll pressure=Pfl−Pfr+Prl−Prr.

Maximum Amplitude and Frequency Calculating Process

Figure 11:
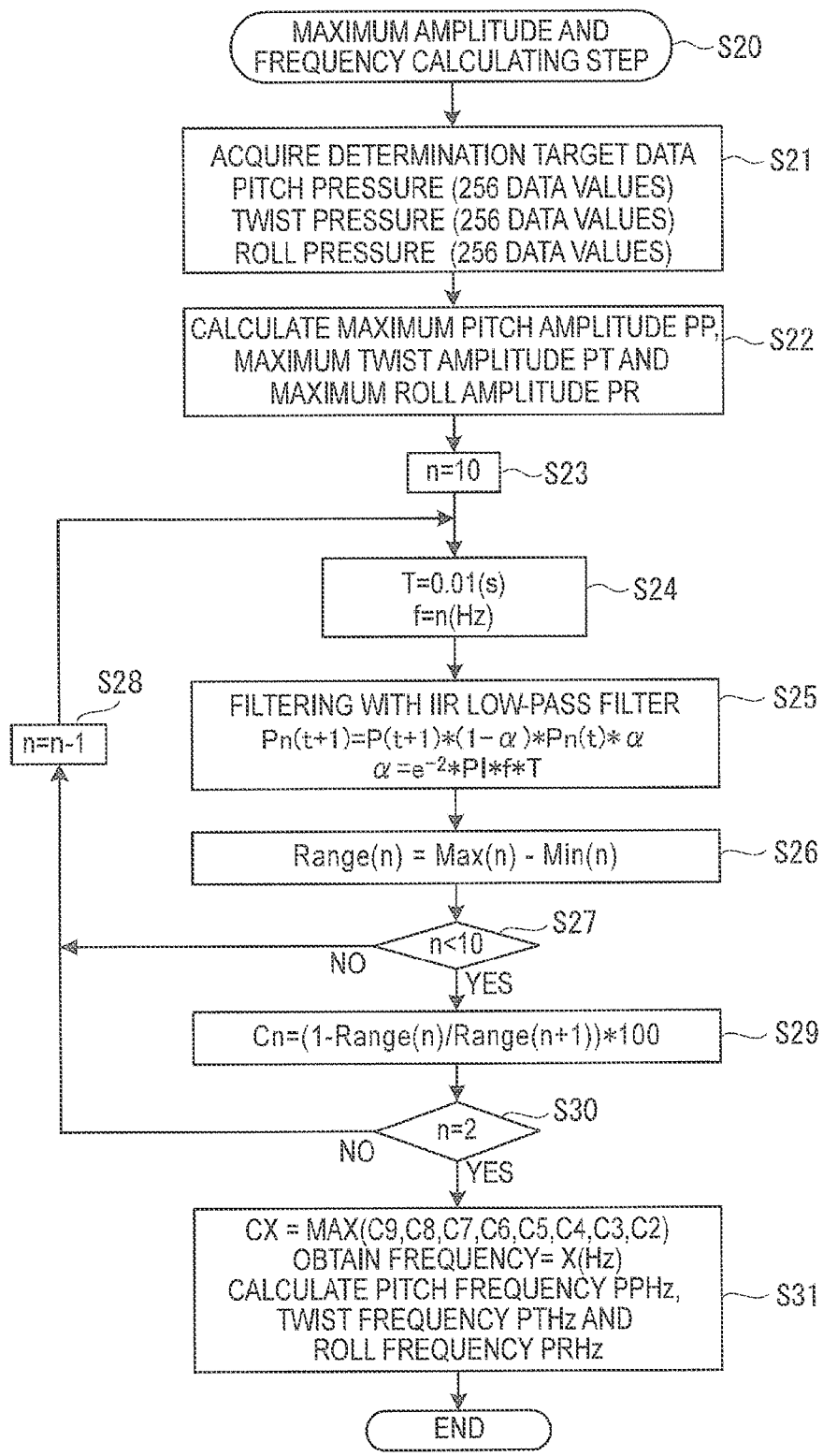
FIG. 11 is a flow chart showing a maximum amplitude and frequency calculating step.

Next, the arithmetic unit 301 of the road surface condition determining device 30 calculates the maximum amplitude and frequency of each of the pitch pressure, the twist pressure and the roll pressure in a predetermined period of time (step S20). A method performed by the arithmetic unit 301 to calculate the maximum amplitude and frequency is shown in detail in a flow chart of FIG. 11.

It should be noted that in the case of calculating only the pitch pressure as described above, only the maximum amplitude and frequency of the pitch pressure may be calculated. The predetermined period of time is set at, for instance, a minimum time (minimum range) required for determining the amplitude of the suspension pressure variation. Specifically, in the exemplary embodiment the predetermined period of time is 2.56 seconds and a sampling frequency T is 0.01 seconds. 256 data values can thus be obtained in 2.56 seconds.

The arithmetic unit 301 of the road surface condition determining device 30 acquires determination target data collected in the last 2.56 seconds by sampling at a sampling frequency T (e.g., determination target data 1 in FIG. 6) (step S21). In other words, the determination target data including 256 data values of each of the pitch pressure, the twist pressure and the roll pressure are acquired.

Next, the arithmetic unit 301 calculates the maximum amplitude of each of the pitch pressure, the twist pressure and the roll pressure from a difference between the maximum and minimum values of each of the pitch pressure, the twist pressure and the roll pressure in the determination target data (step S22).

The arithmetic unit 301 then proceeds to an operation for calculating the frequency of each of the pitch pressure, the twist pressure and the roll pressure. Although description will be made below on calculation of, for instance, the frequency of the pitch pressure, the frequency of each of the twist pressure and the roll pressure is also calculated by the same operation.

First, the arithmetic unit 301 sets an initial value of a variable n at 10 (step S23). Next, the sampling frequency T and a filter frequency f are set (step S24). The sampling frequency T is a fixed value of 0.01 seconds as described above. The filter frequency f is changed from 10 Hz by 1 Hz and thus is represented as the variable n. For instance, when n=10, f=10 Hz.

The arithmetic unit 301 then proceeds to filtering with an IIR low-pass filter (step S25). Specifically, $P_n(t+1)=P(t+1)\times(1-\alpha)\times P_n(t)\times\alpha$ is calculated. In the above formula, $\alpha = e^{-2\times PI \times f \times T}$, and the filter frequency f and the sampling frequency T are the values as set in step S24. Further, t=0 to 255 and 256 data values of Pn(1) to Pn(256) are generated in step S25. When n=10, (P10) includes 256 data values of P10(1) to P10(256).

The arithmetic unit 301 then compares the values of the Pn(1) to Pn(256) to determine a maximum value Max(n) and a minimum value Min(n), and calculates a difference between the maximum value Max(n) and the minimum value Min(n) to determine an amplitude range Range(n) (step S26).

Next, the arithmetic unit 301 determines whether or not n<10 (step S27). When the process is performed for the first time, since n=10, the result is NO in step S27. In this case, the arithmetic unit 301 sets n=n−1 (i.e., 9) (step S28), and repeats the process from step S24. In this manner, the filter frequency f=9 Hz is obtained through steps S24 to S26, and thus 256 data values of P9(1) to P9(256) are generated to determine the Range(9).

Subsequently, since n=9, the arithmetic unit 301 determines that n<10 in step S27 (YES in step S27). n is subsequently changed by −1 each time, so that the result is always YES in step S27.

The arithmetic unit 301 then calculates a decrease rate Cn of the Range(n) as currently calculated to a Range(n+1) as calculated immediately before (step S29).

Specifically, $Cn = (1 - Range(n)/Range(n+1)) \times 100$.

The arithmetic unit 301 then determines whether or not n=2 (step S30). This is because when n=2, the process of steps S24 to S29 is supposed to be terminated. When the result is NO in step S30, the arithmetic unit 301 subtracts one from n (step S28), and repeats the process of steps S24 to S29. The decrease rates C9 to C2 are in this manner calculated.

When the result is YES in step S30, the arithmetic unit 301 compares C9 to C2 to specify a maximum value of a damping rate CX and obtains a frequency X (step S31).

For instance, when C9=4%, C8=5.5%, C7=4%, C6=4%, C5=3%, C4=5%, C3=6% and C2=4%, C3=6% is the maximum value, so that a filtering frequency 3 Hz corresponding to C3 is determined as the frequency of the current determination target data.

The above process of steps S23 to S31 is repeated for the pressure data values of each of the pitch pressure, the twist pressure and the roll pressure, thereby determining the pitch frequency PPHz, the twist frequency PTHz and the roll frequency PRHz.

Road Surface Grading Step

When the maximum amplitude and frequency calculating step S20 is completed, the road surface condition determining unit 302 of the road surface condition determining device 30 performs a road surface grading step for grading the road surface condition on a scale of four grades such as B to E based on: the results obtained in the maximum amplitude and frequency calculating step S20 such as the maximum pitch amplitude PP, the maximum twist amplitude PT, the maximum roll amplitude PR, the pitch frequency PPHz, the twist frequency PTHz and the roll frequency PRHz; the load amount PLM; and the criteria for determining a road surface condition, as shown in FIG. 5 (step S40).

Figure 12:
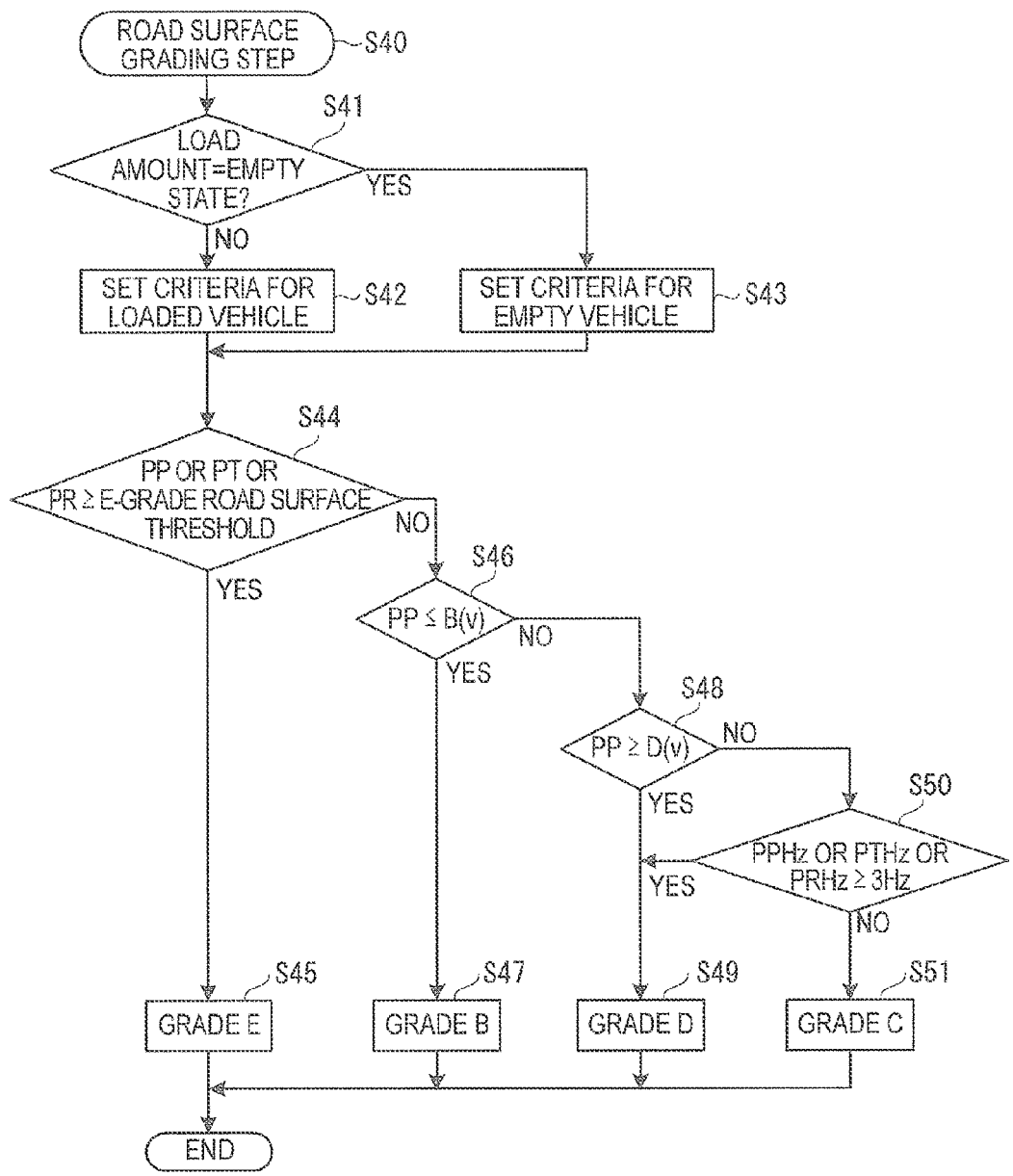
FIG. 12 is a flow chart showing a road surface grading step.

A road surface grading step S40 will be described below in detail with reference to a flow chart of FIG. 12 and graphs of FIGS. 13 to 16.

It should be noted that although evaluation values for a road surface condition may be determined as desired, five grades such as A to E are used in the exemplary embodiment. Specifically, a surface roughness index (i.e., an index showing deterioration of the road surface condition) is gradually increased from A to E. It should be noted that FIG. 1 schematically shows road surfaces graded as A to E. The road surface grading step S40 is intended to discriminate a spot requiring road surface maintenance. Accordingly, a spot having a favorable road surface condition, which should have been graded as A, is collectively graded as B.

Setting of Criteria

The criteria for determining a road surface condition are set based on measurement values obtained when the dump truck 20 in the empty state or in the loaded state travels on each of B-grade to E-grade test road surfaces that are prepared in advance to be graded as B to E.

Figure 13:
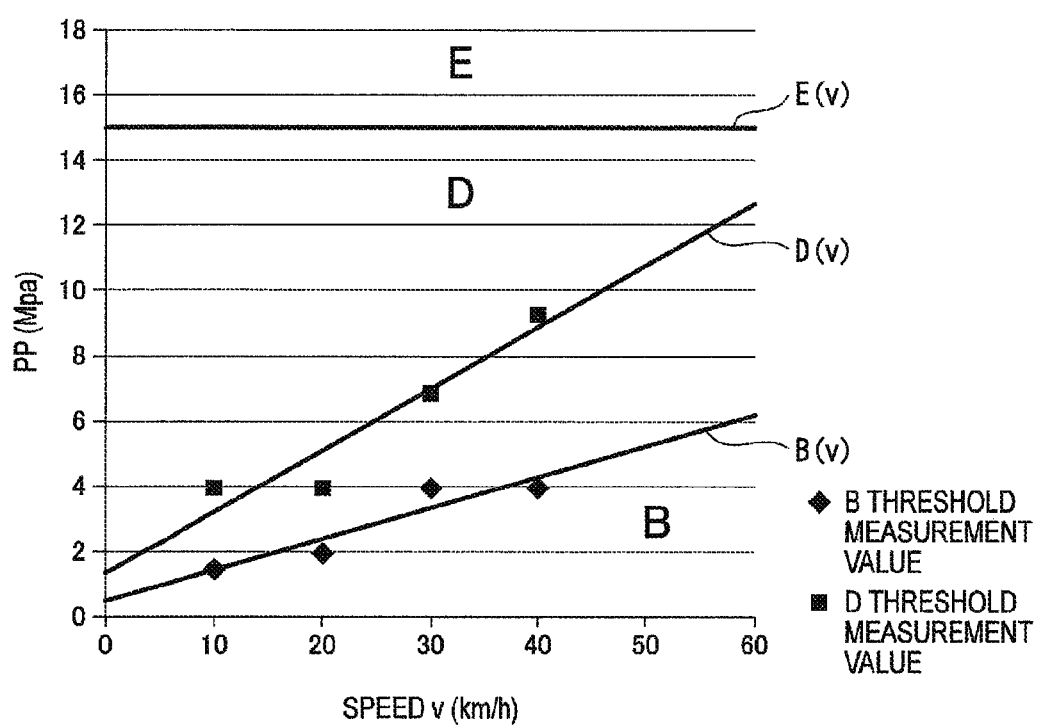
FIG. 13 is a graph showing a relationship between a vehicle speed and a maximum pitch amplitude when the dump truck in a loaded state travels on a test road surface.

FIG. 13 shows a graph based on measurement values obtained when the dump truck 20 in the loaded state travels on each of the B-grade to E-grade road surfaces. Similarly, FIG. 14 shows a graph based on measurement values obtained when the dump truck 20 in the empty state travels on each of the B-grade to E-grade road surfaces.

In the above graphs, the horizontal axis represents the speed v and the vertical axis represents the maximum amplitude PP. It should be noted that each of the test road surfaces is flat and straight and the vehicle speed of the dump truck 20 is kept constant (four speed levels of 10, 20, 30 and 40 km/h in the graphs) during a test, so that the correcting steps S7 to S9 for correcting the suspension pressures are not necessary.

Figure 14:
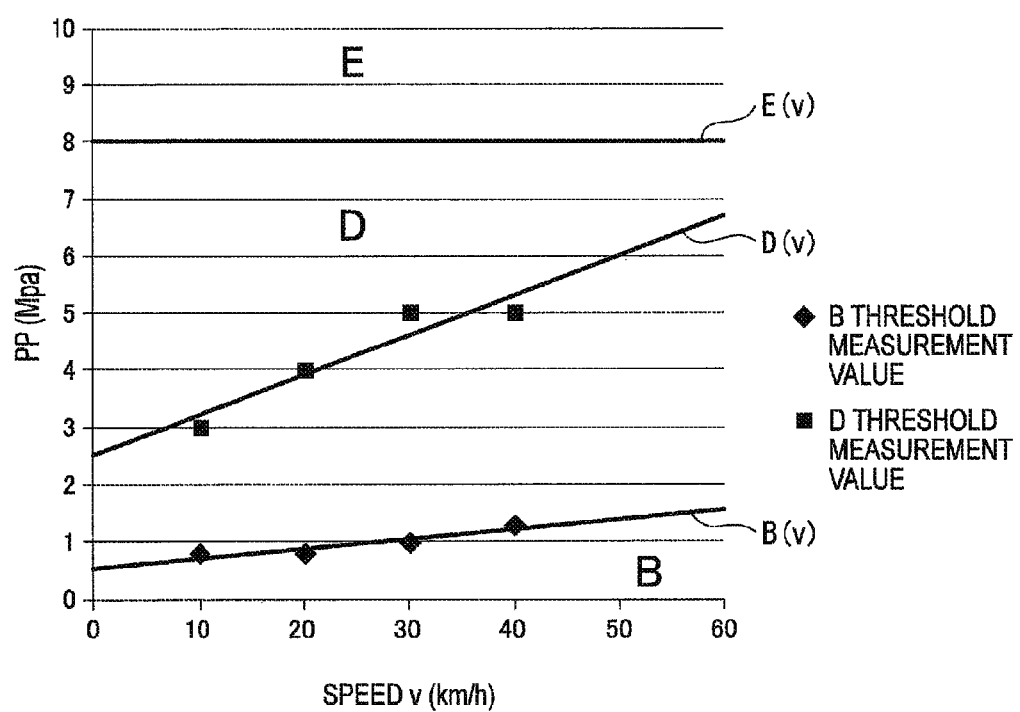
FIG. 14 is a graph showing a relationship between the vehicle speed and the maximum pitch amplitude when the dump truck in an empty state travels on the test road surface.
Figure 15:
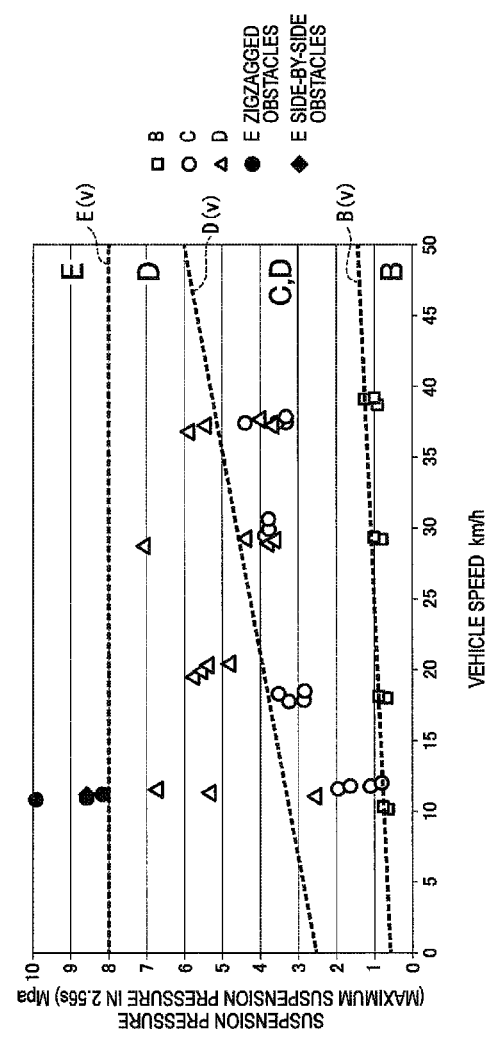
FIG. 15 is a graph showing a relationship between the vehicle speed and the maximum pitch amplitude when the dump truck in the empty state travels on the test road surface.

Therefore, the vertical axis in the graph of each of FIGS. 13 and 14 represents the maximum pitch amplitude PP calculated from the detection values of the suspension pressure sensors 26.

Grading of Road Surface

First, the road surface condition determining unit 302 of the road surface condition determining device 30 determines whether or not the load amount corresponds to the empty state (step S41).

When the result is No in step S41 (i.e., the load amount corresponds to the loaded state), the road surface condition determining unit 302 sets the criteria based on the graph for the loaded state (step S42). Specifically, an E-grade road surface threshold E(v) is set at 15 Mpa, and a B-grade road surface threshold B(v) and a D-grade road surface threshold D(v) are determined from the determination graph of FIG. 13.

In contrast, when the result is YES in step S41 (i.e., the load amount corresponds to the empty state), the road surface condition determining unit 302 sets the criteria based on the graph for the empty state (step S43). Specifically, the E-grade road surface threshold E(v) is set at 8 Mpa, and the B-grade road surface B(v) and the D-grade road surface threshold D(v) are determined from the determination graph of FIG. 14.

In other words, the E-grade road surface threshold E(v) is constant irrespective of the vehicle speed, whereas the B-grade road surface threshold B(v) and the D-grade road surface threshold D(v) are variable depending on the vehicle speed.

The road surface condition determining unit 302 then determines whether or not any one of the maximum pitch amplitude PP, the maximum twist amplitude PT and the maximum roll amplitude PR is equal to or more than the set E-grade road surface threshold (15 Mpa for the loaded state and 8 Mpa for the empty state) (step S44).

When the result is YES in step S44 (i.e., any one of the maximum pitch amplitude PP, the maximum twist amplitude PT and the maximum roll amplitude PR is equal to or more than the E-grade road surface threshold), the road surface is graded as E (step S45). The road surface condition determining process is then completed.

In contrast, when the result is NO in step S44, the road surface condition determining unit 302 then determines whether or not the maximum pitch amplitude PP is equal to or less than the B-grade road surface threshold B(v) (step S46).

When the result is YES in step S46 (i.e., the maximum pitch amplitude PP is equal to or less than the threshold B(v) corresponding to the vehicle speed irrespective of whether the dump truck 20 is emptied or loaded), the road surface is graded as B (step S47). The road surface condition determining process is then completed.

In contrast, when the result is NO in step S46, the road surface condition determining unit 302 determines whether or not the maximum pitch amplitude PP is equal to or more than the threshold D(v) for the D-grade road surface (step S48).

When the result is YES in step S48 (i.e., the maximum pitch amplitude PP is equal to or more than the threshold D(v) corresponding to the vehicle speed irrespective of whether the dump truck 20 is emptied or loaded), the road surface is graded as D (step S49). The road surface condition determining process is then completed.

In contrast, when the result is NO in step S48, the road surface should be a mixture of the C-grade road surface and the D-grade road surface, so that the road surface is graded based on the frequency. Specifically, as shown in the measurement result of FIG. 15 obtained with the dump truck 20 in the empty state, when the value is between the threshold B(v) and the threshold D(v), the road surface is a mixture of the C-grade road surface and the D-grade road surface. Therefore, the C-grade road surface and the D-grade road surface cannot be discriminated from each other merely based on the maximum pitch amplitude PP.

In order to discriminate the C-grade road surface and the D-grade road surface from each other, the road surface condition determining unit 302 determines whether or not any one of the pitch frequency PPHz, the twist frequency PTHz and the roll frequency PRHz is 3 Hz or more irrespective of whether or not the dump truck 20 is in the empty state or in the loaded state (step S50).

Figure 16:
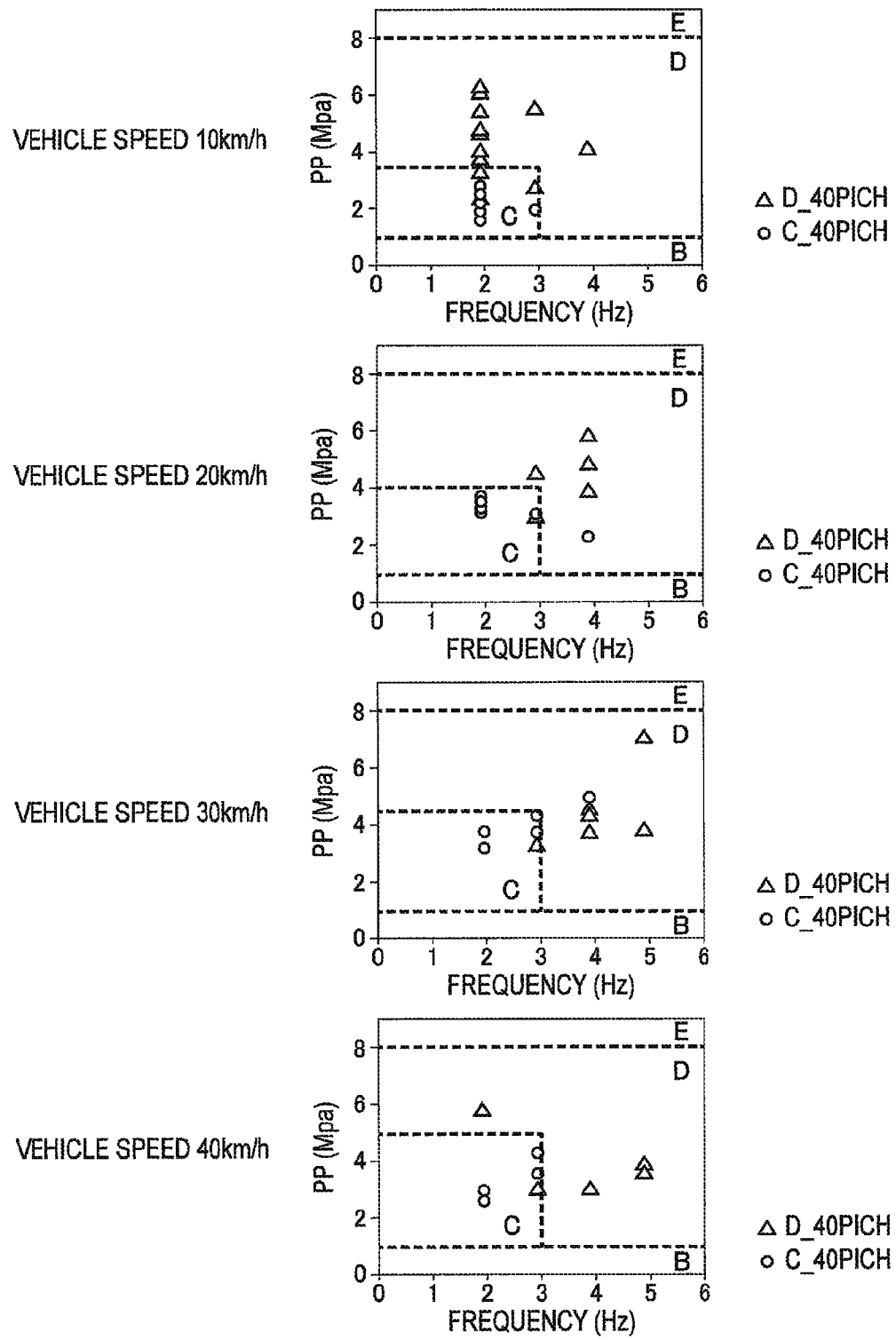
FIG. 16 is a graph showing a relationship at each vehicle speed between a pitch frequency and a maximum pitch amplitude of the vehicle during travel the test road.

Specifically, FIG. 16 shows a relationship between the pitch frequency PPHz and the maximum pitch amplitude PP at each vehicle speed during the travel of the dump truck 20 on a test road surface at a constant vehicle speed. As proven from graphs in FIG. 16, the C-grade road surface and the D-grade road surface can be discriminated from each other at a frequency of 3 Hz.

Accordingly, when any one of the above frequencies is determined to be 3 Hz or more in step S50 (YES in step S50), the road surface is graded as D by the road surface condition determining device 30 (step S49), whereas when any one of the above frequencies is determined to be less than 3 Hz (NO in step S50), the road surface is graded as C (step S51). The road surface condition determining process is then completed.

When the road surface grading step S40 is completed, the road surface condition determining device 30 stores data obtained by the determining process as road surface condition determination information in the in-vehicle memory 31 as shown in FIG. 5 (step S60). Specifically, the road surface condition determining device 30 stores the road surface condition determination information along with the position information 291 in the in-vehicle memory 31 and completes the road surface condition determining process, the road surface condition including the speed v, the load amount PLM, the sudden braking record 311 (in the case where the acceleration G is less than −0.4), the pitch frequency PPHz, the maximum pitch amplitude PP, the twist frequency PTHz, the maximum twist amplitude PT, the roll frequency PRHz, the maximum roll amplitude PR and the road surface condition determination value 312 (one of B to E).

The road surface condition determining device 30 then repeatedly performs the road surface condition determining process every second on determination target data obtained in the last 2.56 seconds, the road surface condition determining process beginning with the determination preparing step S1. Therefore, as shown in FIG. 6, the determining process is performed every second and the determination result is stored in the in-vehicle memory 31 every second.

Process for Outputting Road Surface Condition Determination Result

Figure 18:
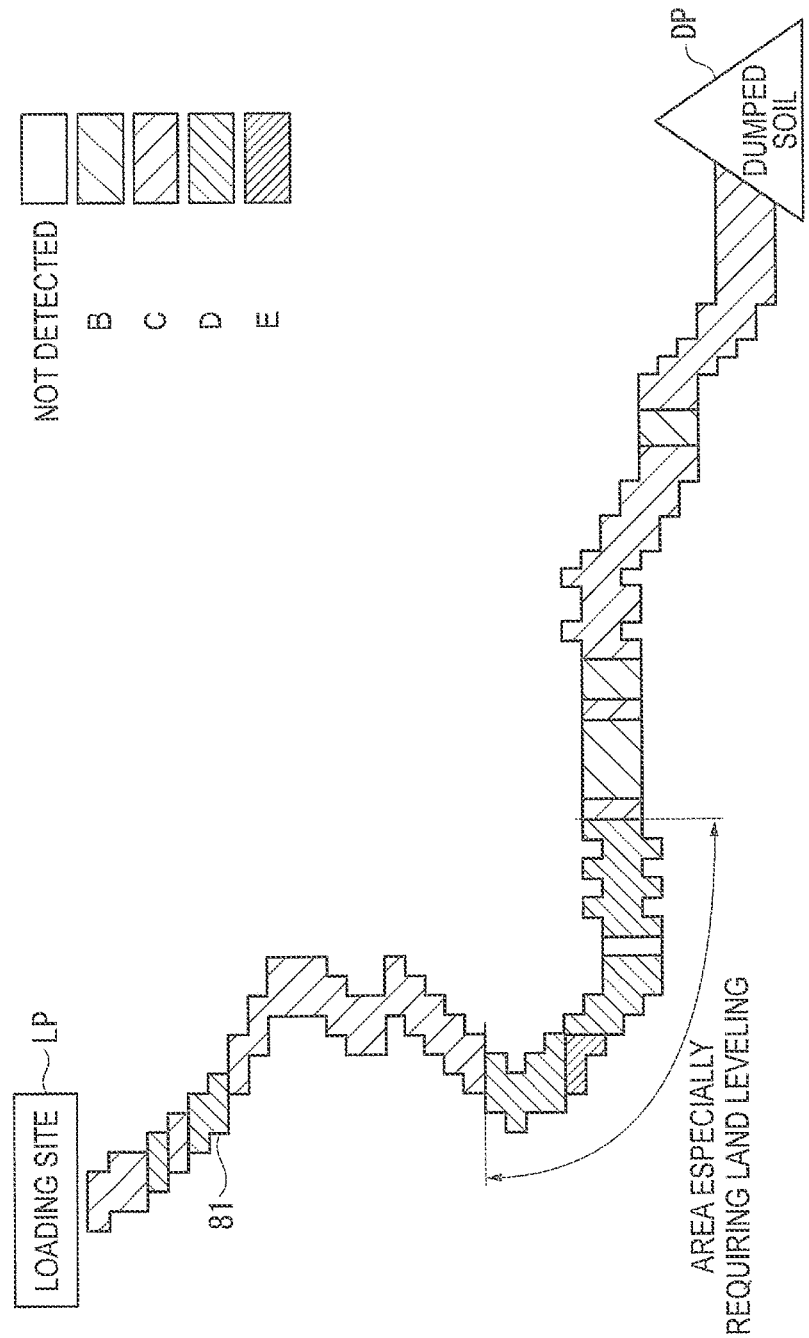
FIG. 18 shows an example of map data outputted by a map outputting process.
Figure 19:
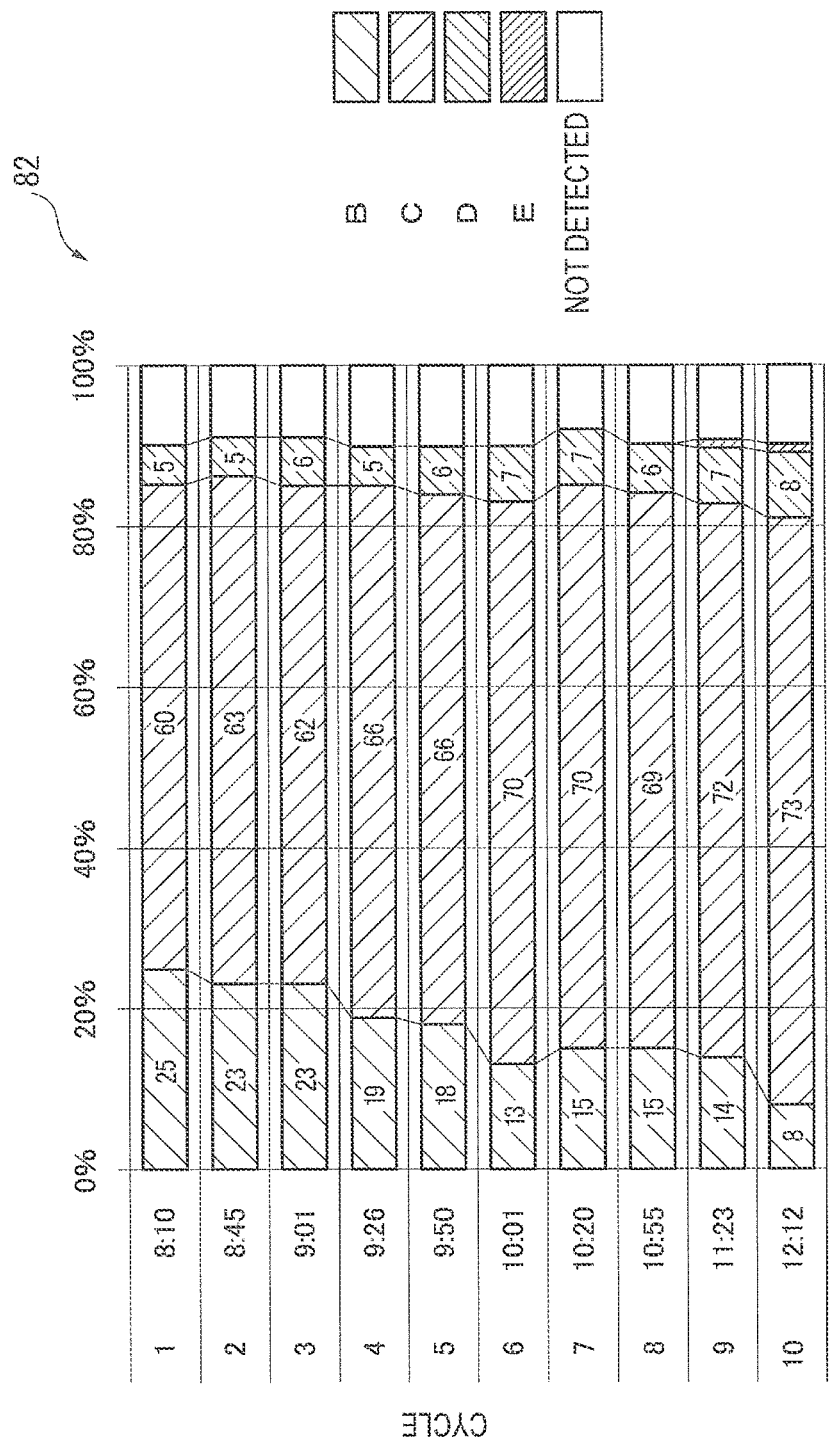
FIG. 19 shows an example of a transition report outputted by a transition report outputting process.

Next, description will be made on a process performed by the road surface condition output equipment 10 to output the road surface condition determination result with reference to a flow chart of FIG. 17 and FIGS. 18 and 19.

Figure 17:
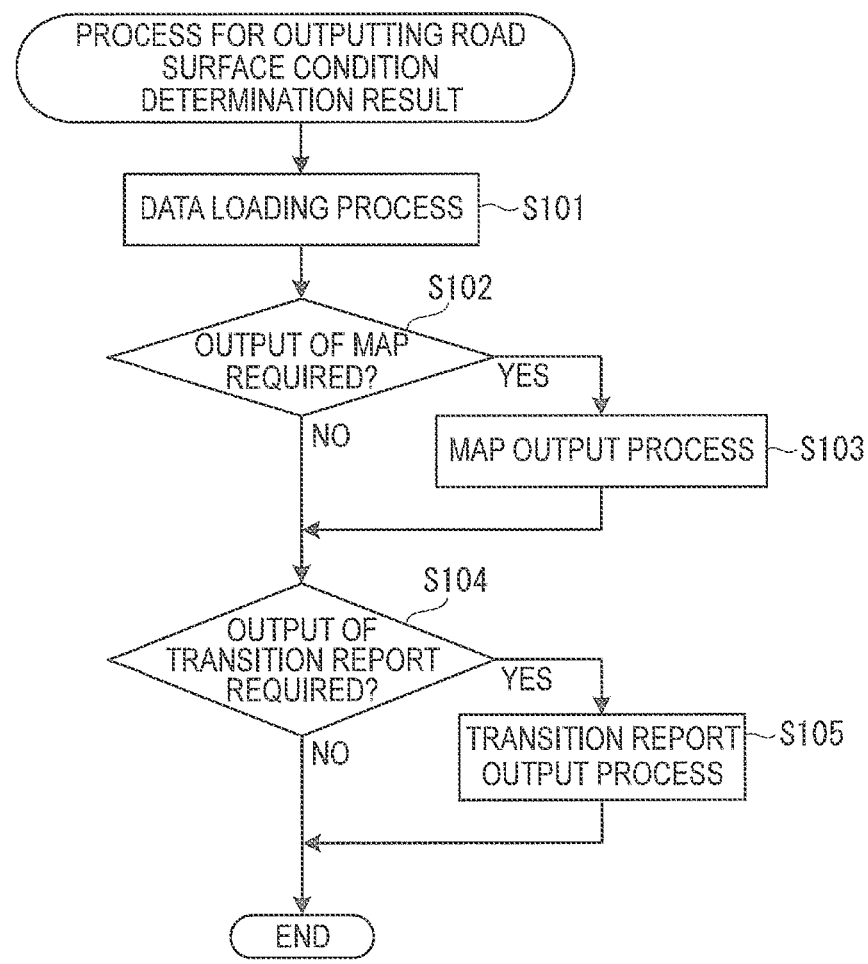
FIG. 17 is a flow chart showing a process for outputting a road surface condition determination result.

As shown in FIG. 17, the data loader 51 of the road surface condition output equipment 10 acquires the road surface condition determination information of the dump truck 20 through the communication device 73 and performs a data loading step to load this information in the memory 60 (step S101).

It should be noted that the road surface condition determination information obtained in the dump truck 20 has been usually temporarily stored in the wireless communication equipment 3, so that the data loader 51 acquires the road surface condition determination information from the wireless communication equipment 3. However, the data loader 51 may alternatively acquire the road surface condition determination information directly from the dump truck 20 through the wireless communication equipment 3.

Next, the map output unit 521 of the output unit 52 determines whether or not map output is requested using the input device 72 (step S102).

When the result is YES in step S102, the map output unit 521 performs a map output process (step S103). In the map output process, the map output unit 521 acquires the position information stored in the memory 60 and the road surface condition determination value 312 associated with the position information, and outputs map data 81 showing the determination result of the road surface condition superimposed on a map to the output device 71 such as a printer or a display.

In the map data 81, a road surface of the route R from the dump site DP to the loading site LP graded as any one of B to E is shown in a different pattern or color. Therefore, a manager of road surface maintenance can easily visually find a spot in the route R that has a rough road surface and requires land leveling.

Subsequently, the transition output unit 522 of the output unit 52 determines whether or not output of a transition report of the road surface condition is requested using the input device 72 (step S104).

When the result is YES in step S104, the transition output unit 522 performs a transition report output process (step S105). In the transition report output process, the transition output unit 522 obtains the road surface grades (B to E) per cycle stored in the memory 60 to calculate a distribution ratio (%) of the road surface grades per cycle (the route R), and outputs a transition graph 82 showing the distribution ratio of the B- to E-grade road surfaces shown in FIG. 19 to the output device 71 such as a printer or a display.

With the transition graph 82 that can show a change in the distribution ratio of the B- to E-grade road surfaces with an increase in the number of cycles, the manager of road surface maintenance can know the pace of road surface deterioration and easily visually find a timing for land leveling.

Incidentally, it should be understood that the scope of the invention is not limited to the above-described exemplary embodiment but includes modifications and improvements as long as the modifications and improvements are compatible with the invention.

For instance, in the exemplary embodiment, the frequency is considered only to discriminate the C-grade road surface and the D-grade road surface from each other, but may be considered to discriminate any other road surface grades. In other words, the road surface may be graded based on a combination of the maximum amplitude and the frequency, if necessary.

Further, in the exemplary embodiment, the road surface is graded based on the maximum amplitude of any one of pitch, twist and roll, but may alternatively be graded based on a variation in a three-axis acceleration of the vehicle body in place of the maximum amplitude.

In the exemplary embodiment, the three correcting steps S7, S8, S9 are performed, but any one or two of them may be performed. Alternatively, another correcting step may be added or none of the correcting steps S7, S8, S9 may be performed.

In the exemplary embodiment, the position information 291 and the road surface condition determination value 312 are associated with each other and stored in the in-vehicle memory 31. However, for instance, in merely determining whether or not the E-grade road surface exists in a route, it is not necessary to associate the road surface condition determination value 312 with the position information 291.

In the exemplary embodiment, the dump site DP is defined as the start and end of the route R. However, the invention is applicable to the case where the start and end of the route R are different (i.e., the outgoing route Rg and the return route Rr are different).

The invention is applicable not only to a dump truck but also to any other haulage vehicle as long as the haulage vehicle repeatedly travels on the same route and is intended to usually carry substantially the same amount of a load substance.

The road surface condition output equipment 10 according to the invention may be located at a place different from a management office in a mine or the like where the haulage vehicle works. For instance, each haulage vehicle may be provided with the road surface condition output equipment 10 so that a determination result of a road surface condition determined in each haulage vehicle can be outputted. In this case, the determination result of the road surface condition may be outputted to a monitor or the like provided to each haulage vehicle, or may be printed out by a serviceperson for maintaining each haulage vehicle so that the serviceperson can advise a manager.

The road surface condition determining device 30 may be provided to a management office in a mine or outside the mine (e.g., a company in charge of managing the mine or the dump truck 20) in place of being provided to the dump truck 20. In this case, various data acquired by the condition acquiring unit 32 is outputted from the dump truck 20 so that the road surface condition determining device 30 such as a server in a management office performs the road surface condition determining process based on the acquired data.

The invention claimed is:

1. A road surface condition determining method comprising:
    detecting a suspension pressure of a haulage vehicle during a travel of the haulage vehicle;
    correcting a detection value of the suspension pressure based on at least one of a rudder angle of the haulage vehicle or a vehicle speed measurement to obtain a correction value of the suspension pressure,
    calculating a maximum amplitude and a frequency of the correction value of the suspension pressure in a predetermined period of time; and
    determining a road surface condition based on the maximum amplitude and the frequency.

2. The road surface condition determining method according to claim 1, wherein the detection value of the suspension pressure is detected to determine the road surface condition when a load amount of a load substance on the haulage vehicle corresponds to an empty state or a loaded state of the haulage vehicle.

3. The road surface condition determining method according to claim 1, further comprising obtaining a detection value of a load shift in a pitch direction based on the suspension pressure, wherein
the road surface condition is determined based on a maximum amplitude and a frequency of the detection value of the load shift in the predetermined period of time.

4. The road surface condition determining method according to claim 3, further comprising:
detecting position information of the haulage vehicle during the travel of the haulage vehicle; and
associating a determination result of the road surface condition with the position information.

5. A method for outputting the road surface condition determined by the road surface condition determining method according to claim 4, the method for outputting the road surface condition comprising outputting map data showing the determination result of the road surface condition, the map data being prepared based on the position information and the determination result of the road surface condition associated with each other.

6. A method for outputting the road surface condition determined by the road surface condition determining method according to claim 4, the haulage vehicle traveling a same route in a plurality of cycles, the method for outputting the road surface condition comprising:
acquiring the determination result of the road surface condition per each of the plurality of cycles as a cycle data set; and
outputting the cycle data set of each of the plurality of cycles in a form of distribution data.

7. A road surface condition determining device comprising:
a pressure detector configured to detect a suspension pressure of a haulage vehicle during a travel of the haulage vehicle;
an arithmetic unit configured to correct a detection value of the suspension pressure based on at least one of a rudder angle of the haulage vehicle or a vehicle speed measurement to obtain a correction value of the suspension pressure, and calculate a maximum amplitude and a frequency of a the correction value of the suspension pressure in a predetermined period of time; and
a road surface condition determining unit configured to determine a road surface condition based on the maximum amplitude and the frequency.

8. The road surface condition determining method according to claim 1, wherein calculating the maximum amplitude and the frequency of the detection value of the suspension pressure in the predetermined period of time includes calculating a maximum pitch amplitude and a pitch frequency, and wherein determining the road surface condition based on the maximum pitch amplitude and the pitch frequency includes determining the road surface condition based on the maximum pitch amplitude and the pitch frequency.

9. The road surface condition determining device according to claim 7, further comprising:
a position information detector configured to detect position information of the haulage vehicle during the travel of the haulage vehicle; and
a first memory configured to store the position information and the determination result of the road surface condition in association with each other.

10. Output equipment for outputting the road surface condition determined by the road surface condition determining device according to claim 9, the output equipment comprising:
a data loader configured to acquire and store the position information and the determination result of the road surface condition associated with each other in a second memory; and
an output unit configured to output map data showing the determination result of the road surface condition, the map data being prepared based on the position information and the determination result of the road surface condition stored in the second memory.

11. Output equipment for outputting the road surface condition determined by the road surface condition determining device according to claim 9, the haulage vehicle traveling a same route in a plurality of cycles, the output equipment comprising:
a data loader configured to acquire the determination result of the road surface condition per each of the plurality of cycles as a cycle data set and store the cycle data set in a second memory; and
an output unit configured to output the cycle data set of each of the plurality of cycles stored in the second memory in a form of distribution data.

12. The road surface condition determining device according to claim 7, wherein the arithmetic unit is configured to calculate a maximum pitch amplitude and a pitch frequency based on the detection value of the suspension pressure in the predetermined period of time, and wherein the road surface condition determining unit is configured to determine the road surface condition based on the maximum pitch amplitude and the pitch frequency.

13. The road surface condition determining device according to claim 9, wherein the arithmetic unit is configured to calculate a maximum pitch amplitude and a pitch frequency based on the detection value of the suspension pressure in the predetermined period of time, and wherein the road surface condition determining unit is configured to determine the road surface condition based on the maximum pitch amplitude and the pitch frequency.

14. A road surface condition determining device comprising:
a pressure detector configured to detect a suspension pressure of a haulage vehicle during a travel of the haulage vehicle;
an arithmetic unit configured to calculate a maximum amplitude and a frequency of a detection value of the suspension pressure in a predetermined period of time; and
a road surface condition determining unit configured to determine a road surface condition based on the maximum amplitude and the frequency,
wherein the arithmetic unit is configured to calculate a maximum pitch amplitude and a pitch frequency based on the detection value of the suspension pressure in the predetermined period of time, and wherein the road surface condition determining unit is configured to determine the road surface condition based on the maximum pitch amplitude and the pitch frequency.

* * * * *